(12) United States Patent
Kojima et al.

(10) Patent No.: US 6,416,837 B1
(45) Date of Patent: Jul. 9, 2002

(54) INFORMATION RECORDING MEDIUM, A METHOD FOR MANUFACTURING THE SAME AND A METHOD FOR RECORDING/REPRODUCING INFORMATION THEREON

(75) Inventors: Rie Kojima; Noboru Yamada, both of Osaka; Hideki Kitaura, Kyoto, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/531,709

(22) Filed: Mar. 21, 2000

(30) Foreign Application Priority Data

Mar. 26, 1999 (JP) .......................................... 11-083312
Nov. 17, 1999 (JP) .......................................... 11-326537

(51) Int. Cl.$^7$ ................................................ B32B 3/02
(52) U.S. Cl. ..................... 428/64.1; 428/64.5; 428/64.6; 430/270.13
(58) Field of Search .............................. 428/64.1, 64.2, 428/64.4, 64.5, 64.6, 913; 430/270.13, 495.1, 945; 369/283, 288

(56) References Cited

U.S. PATENT DOCUMENTS

| | | | |
|---|---|---|---|
| 5,135,819 A | 8/1992 | Ito et al. | |
| 5,278,011 A | 1/1994 | Yamada et al. | |
| 5,446,723 A | 8/1995 | Best et al. | |
| 5,581,539 A | 12/1996 | Horie et al. | |
| 5,631,895 A | 5/1997 | Okada et al. | |
| 5,652,036 A | 7/1997 | Kobayashi | |
| 5,764,619 A | 6/1998 | Nishiuchi et al. | |
| 6,108,295 A | * 8/2000 | Ohno | 369/275.2 |
| 6,115,352 A | * 9/2000 | Ohno | 369/275.4 |
| 6,143,468 A | * 11/2000 | Ohno | 430/270.13 |

FOREIGN PATENT DOCUMENTS

| | | |
|---|---|---|
| EP | 499 273 | 8/1992 |
| EP | 683 485 | 11/1995 |
| JP | 62-209741 | 9/1987 |
| JP | 2-3119 | 1/1990 |
| JP | 2-94039 | 4/1990 |
| JP | 8-315360 | 11/1996 |
| WO | WO98/38636 | 9/1998 |
| WO | WO98/47142 | 10/1998 |

OTHER PUBLICATIONS

"Worterbuch der Chemie"; XP 2176892.
EPO Search Report.
"Wave Optics"; Hiroshi Kubota et al.; pp. 199–236; 1971 and partial translation (10 pages).

* cited by examiner

*Primary Examiner*—Elizabeth Evans
(74) *Attorney, Agent, or Firm*—Merchant & Gould PC

(57) ABSTRACT

An information recording medium includes at least a recording layer formed on a substrate, the recording layer including a phase change layer in which a reversible phase change is caused between a crystalline state and an amorphous state by irradiation of a light beam, and a crystallization-ability improving layer for improving a crystallization ability of the phase change layer. The crystallization-ability improving layer is formed before the phase change layer is formed. Thus, crystal nucleus generation and crystal growth are caused during formation of the phase change layer, so that at least a portion of the phase change layer is in the crystalline phase after the formation. Thus, information signals can be recorded/reproduced at a high density and a high linear velocity, and thus the present invention provides a highly reliable optical information recording medium. Further, the present invention provides an information recording medium that allows a recording operation to be performed on the recording layer in the as-depo amorphous state without the initialization process.

51 Claims, 8 Drawing Sheets

INFORMATION RECORDING MEDIUM, A METHOD FOR MANUFACTURING THE SAME AND A METHOD FOR RECORDING/REPRODUCING INFORMATION THEREON

BACKGROUND OF THE INVENTION

1. Field of the Invention

The present invention relates to an optically recordable, reproducible, erasable and rewritable information recording medium, a method for manufacturing the medium and a method for recording/reproducing information thereon.

2. Description of the Prior Art

Conventionally, for a phase changeable information recording medium, a multilayered film including a recording layer where a reversible phase change is caused between a crystalline state and an amorphous state is formed on a transparent disk substrate by sputtering or the like in the film formation process. The structure of the recording layer is amorphous after the film formation, and then the recording layer is subjected to a process for changing the entire surface of the recording layer from the amorphous state to the crystalline state by optical or thermal means (hereinafter, referred to as an initialization process). Thus, a phase changeable information recording medium is manufactured. (In the specification of the present invention, the thus formed amorphous state in the film formation process is referred to as "as-depo amorphous" to be distinguished from the amorphous state formed by quenching after melting by power laser irradiation as described below.)

In the phase changeable information recording medium, signals can be recorded or rewritten by irradiating the recording layer with a single laser beam while changing the power between high and low. When the recording layer is irradiated with a high power laser beam to be molten and then quenched, the recording layer becomes amorphous (recorded state). When the recording layer is irradiated with a low power laser beam to be warmed and then cooled gradually, the recording layer becomes crystalline (erased state). Thus, a recording mark on the order of several tenths Am (several 100 nm) is formed on the track. The signals are reproduced by utilizing the difference $\Delta R(\%)$ ($\Delta R=|Rc-Ra|$) between the reflectance Rc (%) of the medium when the recording layer is in the crystalline phase and the reflectance Ra (%) of the medium when the recording layer is in the amorphous phase. In either the medium in which Rc>Ra or Ra>Rc, signals can be recorded/reproduced.

In the initialization process, the reflectance of the medium changes from Ra to Rc. In particular, in the medium optically designed to achieve Ra>Rc, the reflectance is reduced so that it is preferable that Rc is 10% or more.

The initialization process requires equipment provided with optical or thermal means. For example, in the case where a semiconductor laser is used as the optical means, operations for optimizing various conditions such as the shape of the laser beam, the power of laser irradiation, the cooling rate, the rotational speed of the medium and the period of time for irradiation with respect to each particular medium are required. In addition, other problems arise. For example, it is known that the volume of the recording layer is contracted by several % at the time of the phase change from the amorphous phase to the crystalline phase. Therefore, when the recording layer is crystallized after the multilayered film is formed, the volume contraction of the recording layer generates new internal stress, which was not present immediately after the film formation, at least in the layer in contact with the recording layer. If the recording layer is as thin as 10 nm or less, light absorption is small and heat is diffused readily, so that crystallization requires more power density so that a load is applied to grooves or address pits that previously have been transferred on the substrate. Thus, the initialization process poses a large number of problems.

If the initialization process is eliminated, the plant investment and the development cost can be reduced, leading to a significant reduction in the cost of the medium. Different systems to eliminate the initialization process can be conceived for (1) the medium of Rc>Ra and (2) the medium of Ra>Re. In order to obtain good servo characteristics, it is preferable to keep the reflectance high, and it is required that in the case of (1), the recording layer is in the crystalline phase (initial state Rc) after the film formation, and that in the case of (2), the recording layer is in the amorphous phase (initial state Ra) after the film formation. Herein, the initial state refers to the state of the medium before recording. In order to meet these requirements, a technique to crystallize the recording layer during the film formation and a technique to record signals in an amorphous recording layer are required.

A method for crystallizing a recording layer of a phase changeable optical information recording medium during the film-formation is disclosed in WO98/47142. In this method, a crystallization accelerating layer made of a material whose crystal structure is face-centered cubic lattice or rhombohedral lattice is provided, and then the recording layer is formed directly on the crystallization accelerating layer and the substrate temperature is changed from 45° C. to 110° C. during the formation of the recording layer. Furthermore, the examples show that the crystallization accelerating layer is formed of a material comprising at least one of Sb, Bi and Sb compounds and Bi compounds, and the recording layer of the phase changeable optical information recording medium manufactured by this method is formed in the crystalline state.

Furthermore, PCT International Publication No. WO98/38636 discloses methods for manufacturing a phase changeable optical information recording medium that is designed to attain Ra>Rc. In this disclosure, a method in which the substrate temperature is from 35° C. to 150° C. during formation of a recording layer, and a method in which the substrate temperature is from 35° C. to 95° C. immediately before formation of the recording layer are described. The thus produced phase changeable optical information recording medium can achieve high recording characteristics, even if recording is performed first on the as-depo amorphous recording layer without performing an initialization process.

However, in WO98/47142, Bi has a melting point as low as about 271° C., so that it is impossible to raise sputtering power. In WO98/38636, in order to form a film having an as-depo amorphous recording layer by heating the substrate, the entire surface of the substrate is heated uniformly and the temperature is required to be kept. For example, when heating the substrate holder itself, it is very difficult to heat the entire substrate uniformly without contacting the entire surface of the substrate with the substrate holder so as to conduct heat to the substrate. However, when the substrate is contacted with the holder on its entire surface, scratches or dirt are likely to be generated on the surface of the substrate. In addition, when high frequency induction or flash heating is performed, complicated film-forming equipment is required in order to heat the substrate uniformly in a contactless manner in a vacuum apparatus. Moreover, it is difficult to keep a constant temperature stable immediately before or during formation of the film. Furthermore, it is necessary to measure the temperature of the substrate in a contactless manner in the vacuum apparatus and to monitor the temperature outside the apparatus, so that the apparatus inevitably becomes complicated and largescale.

It is believed that the reason why it conventionally is difficult to perform recording on an as-depo amorphous phase is that the as-depo amorphous phase is different in nature from the amorphous phase formed by irradiating a crystalline phase with laser. In general, the amorphous phase has several metastable energy states. When a medium is stored for a long time or under high temperature conditions, the energy state can be changed to a different energy state after the storage. For this reason, since optimal conditions for recording/reproducing are different between before and after the storage, the recording/reproducing characteristics can be changed when recording/reproducing is performed under the same conditions. For example, when a recording mark in the recording layer is shifted to be in a more stable energy state, sensitivity for erasure by crystallizing the recording layer is reduced, so that the erasure ratio can be dropped at the time of overwriting information signals.

SUMMARY OF THE INVENTION

Therefore, with the foregoing in mind, it is a first object of the present invention to provide an information recording medium formed of a material having a high melting point where the recording layer is in a crystalline phase when the film formation is complete without warming the substrate, and thus does not require an initialization process, and a method for manufacturing the same, and to provide an information recording medium that requires reduced energy for crystallization.

It is a second object of the present invention to provide an information recording medium that does not require precise control of the temperature of the substrate immediately before or during film-formation and that allows a recording operation to be performed on the recording layer in the as-depo amorphous state of the information recording medium optically designed to satisfy Ra>Rc, without the initialization process.

It is a third object of the present invention to provide an information recording medium that does not require the initialization process and allows stable reading of addresses or tracking servo control even if Rc is substantially 0%, and to provide a method for manufacturing the information recording medium and a method for recording/reproducing information thereon.

In order to achieve the above objects, an information recording medium of the present invention includes at least a recording layer formed on a substrate, the recording layer including a phase change layer in which a reversible phase change is caused between a crystalline state and an amorphous state by irradiation of a light beam, and a crystallization-ability improving layer for improving the crystallization ability of the phase change layer. The crystallization-ability improving layer is formed before forming the phase change layer. Thus, crystal nucleus generation and crystal growth are caused during formation of the phase change layer, so that at least a portion of the phase change layer is in the crystalline phase after the formation. In this embodiment, it is preferable that the crystallization-ability improving layer is formed of at least one selected from the group consisting of a telluride and a halogenide. More specifically, it is desirable that the telluride is at least one selected from the group consisting of SnTe, PbTe, Te, $Sb_2Te_3$, $Bi_2Te_3$, GeSbTe eutectic and GeBiTe eutectic, and that the thickness thereof is from 1 nm to 10 nm. It is desirable that the halogenide is at least one selected from the group consisting of $ZnF_2$, $AlF_2$, KF, $CaF_2$, NaF, $BaF_2$, $MgF_2$, $LaF_3$, and LiF, and that the thickness thereof is from 1 nm to 20 nm. It is preferable that the phase change layer is formed of a material comprising GeSbTe as the main component and having a halite type crystal structure. It is more preferable that also the crystallization-ability improving layer has a halite type crystal structure. The phase change layer is formed preferably at a rate r (nm/min) in a range from 5 nm/min to 20 nm/min. It is possible to make the formed phase change layer be in the crystalline phase by using a telluride and a halogenide as the material for the crystallization-ability improving layer and forming the phase change layer at a low rate.

Furthermore, the present invention has a function to achieve A<B, where A is an energy for crystallizing the phase change layer in the case where the crystallization-ability improving layer is formed, and B is an energy for crystallizing the phase change layer in the case where the crystallization-ability improving layer is not formed.

According to another aspect of the present invention, an information recording medium of the present invention is a two layered information recording medium formed by attaching a first information recording medium comprising at least a first recording layer formed on a first substrate and a second information recording medium comprising at least a second recording layer formed on a second substrate. The first recording layer includes a phase change layer in which a reversible phase change is caused between a crystalline state and an amorphous state by irradiation of a light beam, and a crystallization-ability improving layer for improving the crystallization ability of the phase change layer. The crystallization-ability improving layer is formed before forming the phase change layer, so that crystal nucleus generation and crystal growth are caused during formation of the phase change layer, and at least a portion of the phase change layer is in the crystalline phase after the formation. This embodiment allows crystal nucleus generation and crystal growth during formation of the first recording layer, so that at least a portion of the phase change layer is in the crystalline phase after the formation.

Furthermore, the present invention is an information recording medium including a recording layer on a substrate. The recording layer includes a phase change layer in which a reversible phase change is caused between a crystalline state and an amorphous state by irradiation of a light beam (herein, "layer" refers not only to a layer formed uniformly all over, but also a layer formed in a shape of an island, which also applies to a crystal nucleus supplying layer); and a crystal nucleus supplying layer that is laminated on the phase change layer and accelerates crystallization of the phase change layer. The information recording medium of this embodiment allows recording to be started on the phase change layer in the as-depo amorphous state. Furthermore, the information recording medium of this embodiment provides a highly reliable information recording medium for recording/reproducing information signals at a high density and a high linear velocity.

In the information recording medium, it is preferable that the crystal nucleus supplying layer and the phase change layer are formed from a substrate side in this order. It is preferable that the information recording medium further includes a second crystal nucleus supplying layer for accelerating crystallization of the phase change layer, and the phase change layer and the second crystal nucleus supplying layer are formed from a substrate side in this order. It is preferable that the phase change layer and the crystal nucleus supplying layer are formed from a substrate side in this order.

In the information recording medium, it is preferable that the transition temperature Tx1 (° C.) from the amorphous phase to the crystalline phase of the crystal nucleus supplying layer (hereinafter, referred to crystallization temperature) and the crystallization temperature Tx2 (° C.) of the phase change layer satisfy the relationship: Tx2>Tx1. This embodiment facilitates the crystallization of the phase change layer. In the information recording medium, it is preferable that the melting point Tm1 (° C.) of the crystal nucleus supplying layer and the melting point Tm2 (° C.) of the phase change layer satisfy the relationship: Tm1>Tm2. This embodiment provides an information recording medium in which the crystal nucleus supplying layer is highly stable even if the crystal nucleus supplying layer is provided nearer the laser beam incident side than the phase change layer is.

In the information recording medium, it is preferable that the crystal nucleus supplying layer comprises Te. This embodiment facilitates the crystallization of the phase change layer because Te functions as the crystal nucleus. In the information recording medium, it is preferable that the crystal nucleus supplying layer comprises at least one selected from the group consisting of SnTe and PbTe. In the information recording medium, it is preferable that the crystal nucleus supplying layer comprises SnTe—M, where M is at least one selected from the group consisting of N, Ag, Cu, Co, Ge, Mn, Nb, Ni, Pd, Pt, Sb, Se, Ti, V Zr and PbTe). Herein, SnTe—M is SnTe provided with M without changing the ratio of Te that is present with respect to the Sn that is present. For example, SnTe—M includes compounds of SnTe and M and eutectics of SnTe and M. The content of the M is preferably at most 50%, more preferably 0.5–50 atom %. Furthermore, a preferable composition of SnTe is the stoichiometric composition of $Sn_{50}Te_{50}$ (Sn:Te=50:50), but a tolerance of about ±5% such as $Sn_{45}Te_{55}$ (Sn:Te=45:55), and $Sn_{55}Te_{45}$ (Sn:Te=55:45) is possible.

In the information recording medium, it is preferable that the phase change layer is formed of a chalcogen based material. This embodiment provides an information recording medium on which information can be recorded at a high density. In the information recording medium, it is preferable that the phase change layer comprises at least one selected from the group consisting of GeTe, GeSbTe, TeSnSe, InSbTe, GeBiTe and AgInSbTe. In the information recording medium, it is preferable that the phase change layer comprises GeSbTe and at least one element selected from the group consisting of Ag, Sn, Cr, Mn, Pb, Bi, Pd, Se, In, Ti, Zr, Au, Pt, Al and N.

In the information recording medium, it is preferable that the thickness d1 (nm) of the crystal nucleus supplying layer and the thickness d2 (nm) of the phase change layer satisfy the relationship: d2>d1. This embodiment prevents the amount of a laser beam incident on the phase change layer from being insufficient. In the information recording medium, it is preferable that the thickness d1 (nm) of the crystal nucleus supplying layer is in the range of $0.3<d1\leq5$. In the information recording medium, it is preferable that the thickness d2 (nm) of the phase change layer is in the range of $3\leq d2>20$ In the information recording medium, the reflectance Rc (%) of the information recording medium when the phase change layer is in the crystalline phase and the reflectance Ra (%) of the information recording medium when the phase change layer is in the amorphous phase satisfy the relationship: Ra>Rc. This embodiment provides an information recording medium in which grooves or addresses formed on the substrate can be detected easily.

According to another aspect of the present invention, a method for manufacturing an information recording medium of the present invention, the information recording medium comprising at least a recording layer, includes forming the recording layer. The recording layer includes a phase change layer in which a reversible phase change is caused between a crystalline state and an amorphous state by irradiation of a light beam; and a crystal nucleus supplying layer that is laminated on the phase change layer and accelerates crystallization of the phase change layer. The method for manufacturing an information recording medium of this embodiment allows the information recording medium of the present invention to be produced easily. In the method for manufacturing an information recording medium, it is preferable that the step of forming the phase change layer is performed under a condition that allows the phase change layer to become amorphous. This embodiment allows as-depo recording.

In the method for manufacturing an information recording medium, the rate r(nm/min) at which the phase change layer is formed is preferably in the range of $r\geq30$. This embodiment allows the formed phase change layer to be in the amorphous state.

According to another aspect of the present invention, the present invention provides a method for recording/reproducing information on an information recording medium, the information recording medium comprising at least a recording layer. The recording layer includes a phase change layer and in which a reversible phase change is caused between the crystalline state and the amorphous state, and a crystal nucleus supplying layer that is laminated on the phase change layer and that facilitates the crystallization of the phase change layer. The information is recorded by causing the phase change in the phase change layer by irradiating the recording layer with a laser beam. The method for recording/reproducing information on an information recording medium of this embodiment allows information to be recorded reliably.

In the method for recording/reproducing information on an information recording medium, it is preferable that the crystal nucleus supplying layer comprises at least one selected from the group consisting of SnTe and PbTe. This embodiment allows information to be recorded particularly reliably.

In the method for recording/reproducing information on an information recording medium, it is preferable that the phase change layer comprises at least one selected from the group consisting of GeTe, GeSbTe, TeSnSe, InSbTe, GeBiTe and AgInSbTe. This embodiment allows information to be recorded particularly reliably.

In the method for recording/reproducing information on an information recording medium, it is preferable that the formed phase change layer is in the amorphous state, and recording information is started on the phase change layer in the amorphous state without the phase change layer being crystallized.

These and other advantages of the present invention will become apparent to those skilled in the art upon reading and understanding the following detailed description with reference to the accompanying figures.

BRIEF DESCRIPTION OF THE DRAWINGS

FIG. 4A is a graph in the case where the phase structure is an amorphous phase.

FIG. 4B is a graph in the case where the phase structure is a mixed state of amorphous and crystalline phases.

FIG. 4C is a graph in the case where the phase structure is a crystalline phase.

DESCRIPTION OF THE PREFERRED EMBODIMENTS

Hereinafter, the present invention will be described more specifically with reference to the accompanying drawings. First, an invention intended to eliminate initialization and to make the phase change layer be in the crystalline state when the film is complete will be described with reference to FIGS. 1 to 3.

Figure 1:
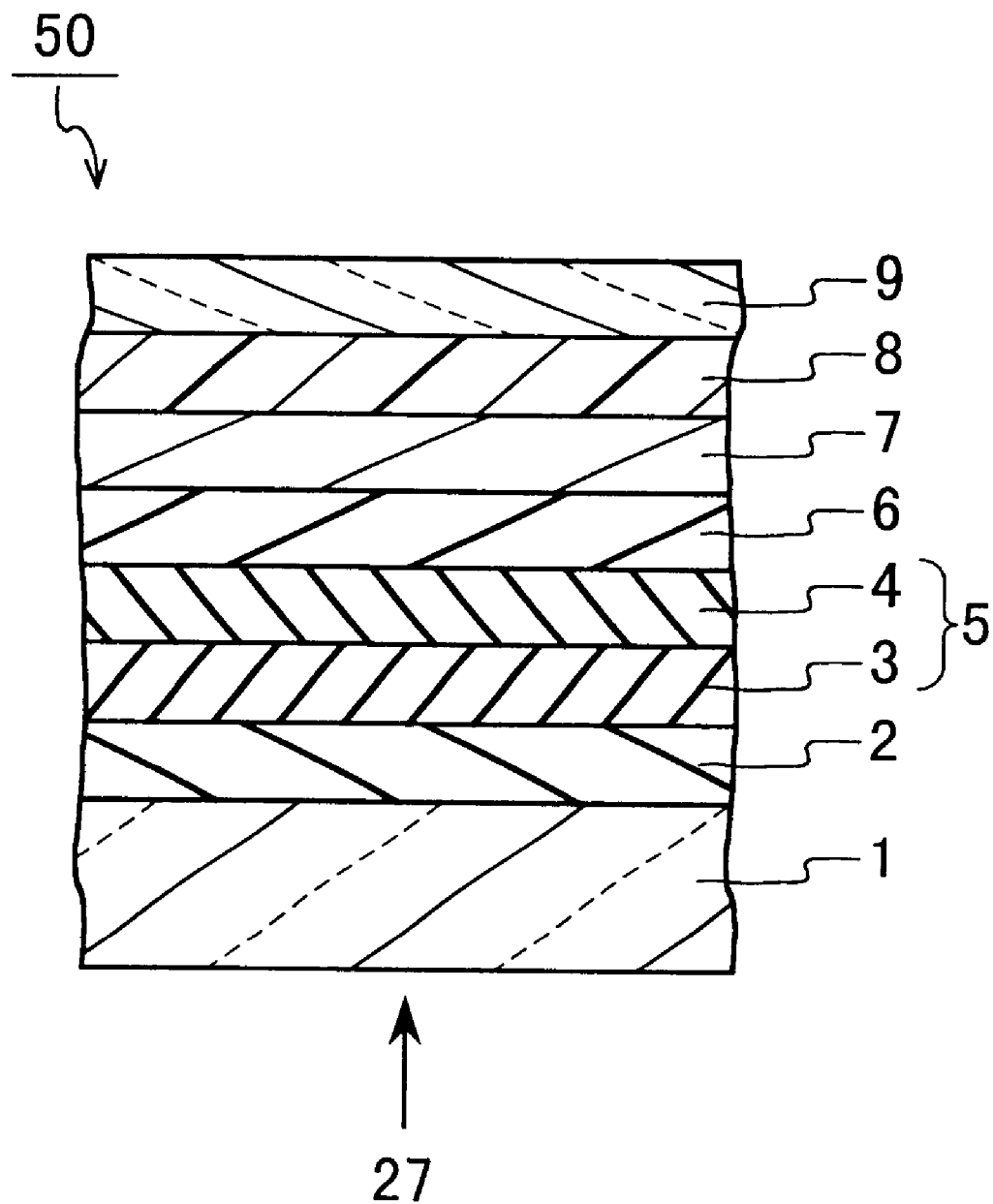
FIG. 1 is a cross-sectional view showing an example of the structure of an information recording medium of the present invention.

FIG. 1 shows an example of the structure of an information recording medium 50 of the present invention. The information recording medium 50 includes a protective layer 2, a crystallization-ability improving layer 3, a phase change layer 4, a protective layer 6 and a reflection layer 7 laminated sequentially on a substrate 1 in this order. A dummy substrate 9 is attached thereto with an adhesive layer 8. A recording layer 5 includes the crystallization-ability improving layer 3 and the phase change layer 4.

As the substrate 1, a transparent disk formed of a polycarbonate resin, a polymethylmethacrylate resin, a polyolefin resin, a norbornene type resin, an ultraviolet curable resin, glass or the like can be used. The thickness of the substrate 1 is not limited to a particular thickness, but a thickness of about 0.05 to 2.0 mm can be used. A spiral or concentric circular guide groove for tracking of laser light is provided on the surface of the substrate 1 on which the film is to be formed, if necessary. The surface on which the film is not formed is smooth.

The protective layers 2 and 6 are dielectric thin films and have the following functions. They improve the optical absorption efficiency to the recording layer by adjusting the optical path so as to attain a significant change in the amount of reflected light between before and after recording so that the signal amplitude can be enlarged. For the purpose of suppressing an increase of noise due to thermal damage or the like to the recording layer 5, and adjusting the reflectance and the absorptance with respect to laser light 27 and the phase of the reflected light, it is preferable to use a material that is physically and chemically stable, has a melting point and a softening point higher than the melting point of the recording layer 5, and does not form a solid solution with the material of the recording layer. Examples of the material include an oxide of Y, Ce, Ti, Zr, Nb, Ta, Co, Zn, Al, Si, Ge, Sn, Pb, Sb, Bi, Te or the like, a nitride of Ti, Zr, Nb, Ta, Cr, Mo, W. B, Al, Ga, In, Si, Ge, Sn, Pb or the like, a carbide of Ti, Zr, Nb, Ta, Cr, Mo, W. Si or the like, a sulfide of Zn, Cd, or the like, a selenide or a telluride, a fluoride of Mg, Ca or the like, a single-element substance such as C, Si, Ge or the like, and a dielectric or a quasi-dielectric comprising a mixture of these. Among these, a mixture, $ZnS$—$SiO_2$ is amorphous and has a high refractive index, a high film-forming rate, good mechanical characteristics and good resistance against humidity, and thus can be an especially excellent protective layer. The thickness of the protective layer can be determined precisely in such a manner that the change in the amount of reflected light in the recording layer from when it is in the crystalline state (before recording) to when it is in the amorphous state (after recording) is largest and the optical absorption to the recording layer 5 is largest, according to the calculation based on a matrix method (e.g., refer to "Wave Optics" by Hiroshi Kubota et al., Section 3, Iwanami Shinsho, 1971). The protective layers 2 and 6 can be formed of different materials or compositions, if necessary, or can be formed of the same material or composition.

The crystallization-ability improving layer 3 of the present invention functions to generate crystalline nucleus and cause crystal growth of the phase change layer 4 formed on the crystallization-ability improving layer 3 to crystallize the phase change layer 4 during the formation. If the formed crystallization-ability improving layer 3 itself has a crystal structure, the function becomes large. Generally, the structure of a thin film obtained by cooling a vapor phase is susceptible to the influence of the structure of the substrate. It is believed that crystallization is accelerated by providing a layer made of a crystalline material before forming the phase change layer 4. It is believed that the more similar the crystal structure of the crystalline layer is to that of the recording layer, the larger the effect is. For example, in the case of a Ge—Sb—Te based material, the crystal structure of the recording layer is of a halite type, and if the crystallization-ability improving layer 3 is constituted of crystals with a halite type structure, the function becomes larger. Examples of the material that has the crystallization effect for the crystallization-ability improving layer 3 include a telluride such as SnTe and PbTe, which are high-speed crystallization materials, Te, $Sb_2Te_2$, $Bi_2Te_3$, GeSbTe eutectic, and GeBiTe eutectic, which have a low melting point, or a halogenide such as $CaF_2$, $MgF_2$, LaF, $AlF_3$, NaF, $BaF_2$, KF, LiF and $ZnF_2$. In particular, SnTe, PbTe, NaF, LiF and KF provide a large effect. In the case of the telluride, since the crystallization-ability improving layer 3 itself absorbs light, the thickness preferably is as small as 1 nm to 10 nm so that optical absorption by the phase change layer 4 is larger. In the case of the halogenide, since the crystallization-ability improving layer 3 itself hardly absorbs light, the thickness can be in the range from 1 nm to 20 nm.

For the phase change layer 4, it is preferable to use a material in which a phase change is caused reversibly between the crystalline state and the amorphous state by irradiation of light beams and whose optical constants (refractive index n and extinction coefficient k) are changed. Te-based materials such as Ge—Sb—Te and Ge—Bi—Te, and materials comprising the Te based materials and at least one element selected from Au, Ag, Cu, Al, Pd, Pt, Ce, Sn, Mn, Cr, and Ti can be used. Furthermore, nitrogen can be added. Among Ge—Sb—Te, in particular, a GeTe—$Sb_2Te_3$ quasi-binary composition, which is a high-speed crystallization material, can ensure good recording/erasing performance. The composition range of GeTe:$Sb_2Te_3$=1–6:1 is excellent in the phase stability, so that the composition is preferable for practical use. The phase change layer 4 comprising nitrogen is formed by performing reactive sputtering in an Ar gas and $N_2$ gas atmosphere, using such a Te-based material as the basic material. The phase structures of the formed crystallization-ability improving layer 3 and the formed phase change layer 4 are evaluated by forming a thin film about 10 nm thick on quartz glass and investigating the temperature at which an optical change is caused while heating the film to about 350° C. with a He—Ne laser. Furthermore, the thickness of the crystallization-ability improving layer 3, and the reflectance and transmission are experimentally investigated so that the complex refractive index with respect to a predetermined laser wavelength is obtained. The obtained complex refractive index is used for the optical calculation of the multilayered film by the matrix method so that the structure of the information recording medium is determined.

The recording layer 5 of the present invention has a two-layered structure composed of the crystalline crystallization-ability improving layer 3 and the phase change layer 4, which is formed after the crystalline crystallization-ability improving layer 3 is formed. This two-layered structure makes it easy to generate the crystal nucleus at the interface with the crystallization-ability improving layer 3 of the phase change layer 4, and crystal growth is caused in the phase change layer 4, so that the formed phase change layer 4 is in the crystalline state. Recording/reproducing of information is performed by utilizing the optical changes in the phase change layer 4. Hereinafter, "the recording layer 5 is in the crystalline state or the amorphous state" refers to "the phase change layer 4 is in the crystalline state or the amorphous state", unless the context otherwise requires.

The reflection layer 7 functions to increase the amount of light absorbed by the recording layer 5 in the optical respect, and to allows heat generated in the recording layer 5 to diffuse swiftly for facilitating the amorphous structure in the thermal respect. Furthermore, the reflection layer 7 also has the function of protecting the multilayered film from the environment where it is used. Examples of the material for the reflection layer 7 include a single metal material having a high thermal conductivity such as Al, Au, Ag and Cu, or an alloy material comprising at least one element of these as the main component and at least one other element added for the purpose of improving the resistance against humidity or adjusting the thermal conductivity, such as Al—Cr, Al—Ti, Ag—Pd, Ag—Pd—Cu, and Ag—Pd—Ti. These materials are excellent in anti-corrosion and satisfy the requirements for quenching. The reflection layer 7 is not necessarily provided, because the amorphous state may be obtained sufficiently without the quenching effect, depending on the recording conditions such as the linear velocity or the composition of the phase change layer.

After the films from the protective layer 2 through the reflection layers 7 are formed, the reflection layer 7 is coated with the adhesive layer 8 by spinning, and then the dummy substrate 9 is attached thereto.

As the adhesive layer 8, a material having high heat resistance and adhesiveness, for example adhesive resins such as an ultraviolet curable resin, can be used, and a material based on an acrylic resin or a material based on an epoxy resin are usable. A disk of a one-face structure can be obtained by attaching the multilayered film to a dummy substrate with an adhesive resin such as an ultraviolet resin having the same nature as above or a different nature, an adhesive tape having two adhesive faces, a dielectric film, or a combination thereof, as shown in FIG. 1. Alternatively, a disk of a two-face structure can be obtained by attaching two multilayered films with their film sides facing each other.

The dummy substrate 9 is provided to increase the mechanical strength of the information recording medium 50 and protect the multilayered film laminate. The dummy substrate 9 can be formed of a material selected from the materials that can be used for the substrate 1. It is important to use a material that does not cause mechanical curving or distortion in the information recording medium 50 attached to the dummy substrate. The dummy substrate 9 is not necessarily formed of the same material nor in the same thickness as those of the substrate 1.

Figure 2:
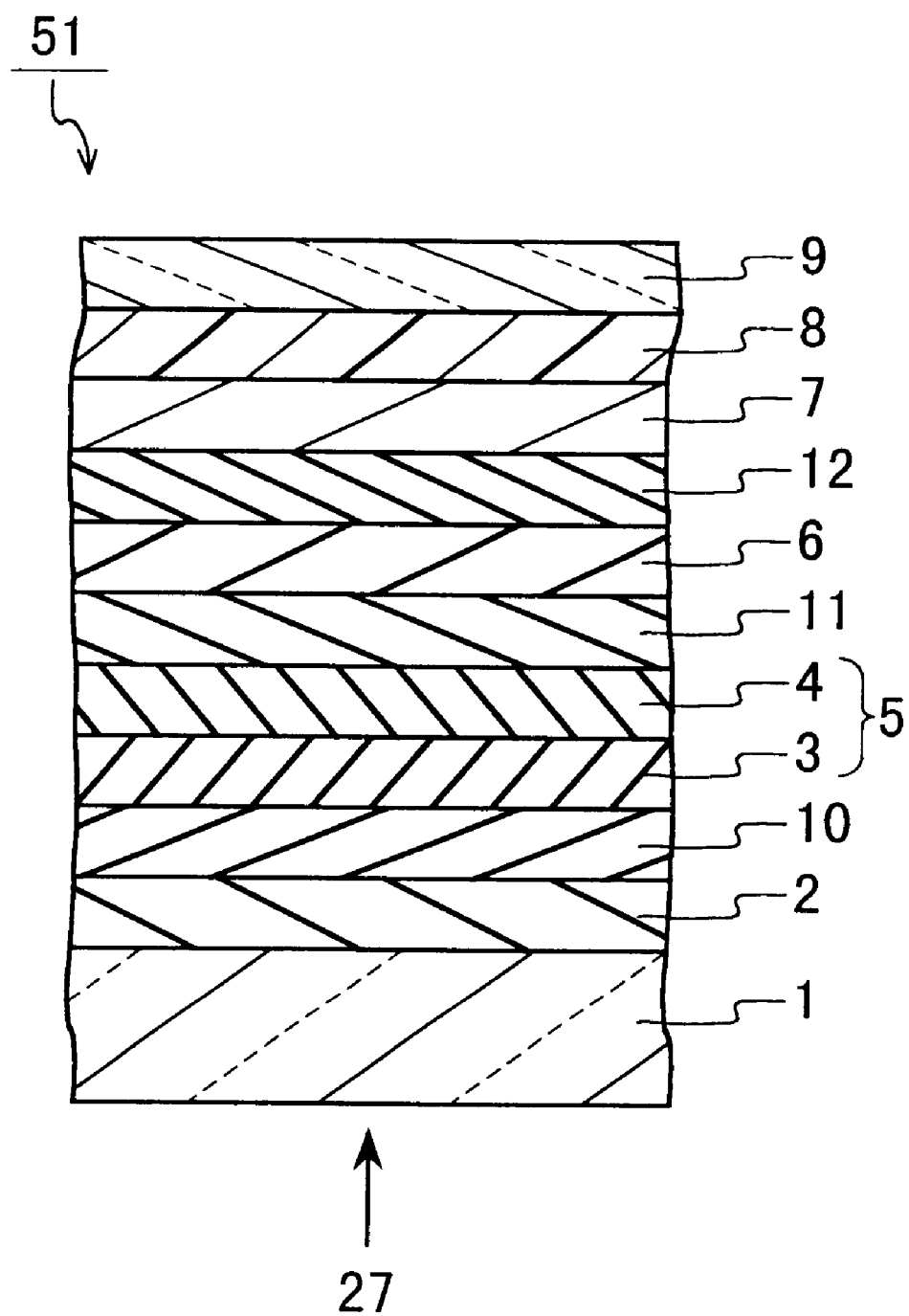
FIG. 2 is a cross-sectional view showing another example of the structure of an information recording medium of the present invention.

FIG. 2 shows an example of the structure of an information recording medium 51 of the present invention. The information recording medium 51 includes a protective layer 2, an interface layer 10, a crystallization-ability improving layer 3, a phase change layer 4, an interface layer 11, a protective layer 6, an light-absorption correcting layer 12 and a reflection layer 7 laminated sequentially on a substrate 1 in this order. A dummy substrate 9 is attached thereto with an adhesive layer 8. This information recording medium 51 is provided with the light-absorption correcting layer 12 between the protective layer 6 and the reflection layer 7 to attain such a light absorption that the light-absorptance Ac of the recording layer 5 that is in the crystalline state is larger than the light-absorptance Aa of the recording layer 5 that is in the amorphous state. Also in this structure, it is confirmed that the phase change layer 4 is crystallized by forming the crystallization-ability improving layer 3 before forming the phase change layer 4.

For the substrate 1, the protective layers 2 and 6, the crystallization-ability improving layer 3, the phase change layer 4, the reflection layer 7, the adhesive layer 8, and the dummy substrate 9, the same types of materials as those in FIG. 1 can be used.

For the interface layers 10 and 11, it is preferable to use a material that has a function to prevent substances generated between the protective layer 2 and the recording layer 5 and the protective layer 6 and the recording layer 5 by repeated recording from moving, and comprises a nitride, an oxide, a nitrogen oxide, or a carbide based on Si, Al, Zr, Ti, Ge, Ta, or Cr, or a mixture thereof as the main component. Providing either one of the interface layer 10 and 11 on one side can be sufficient for the above-described function, but it is more preferable to provide two interface layers on both sides. In this case, different materials or compositions can be used, if necessary, or the same material or composition can be used. The interface layers can be formed by performing reactive sputtering from a metal basic material in an Ar gas and reactive gas atmosphere, or sputtering from a compound basic material in an Ar gas atmosphere. When these interface layers are thick, the reflectance or the absorptance of the multi-layered structure is changed significantly, so that the recording/erasing performance is affected. Therefore, the thickness is preferably 2 nm to 10 nm, and more preferably about 2 nm to 5 nm.

For the light-absorption correcting layer 12, it is preferable to use a material that adjusts the light absorptance ratio of the recording layer 5 in the crystalline state and the recording layer 5 in the amorphous state and does not cause the shape of marks to be distorted at the time of overwriting. In addition, it is preferable that the material has a high refractive index and absorbs light to an appropriate extent for the purpose of raising the difference in the reflectance of the recording layer 5 between in the crystalline state and in the amorphous state so as to enlarge the signal amplitude. For example, a material having a refractive index n of at least 3 and not more than 6 and an extinction coefficient k of at least 1 and not more than 4 can be used. More specifically, it is preferable to use a Ge alloy and a Si alloy that are amorphous, such as Ge—Cr, Ge—Mo, Si—Cr, Si—Mo and Si—W, or tellurides, crystalline metals such as Ti, Zr, Nb, Ta, Cr, Mo, W, SnTe and PbTe, a semi-metal or a semiconductor material.

Figure 3:
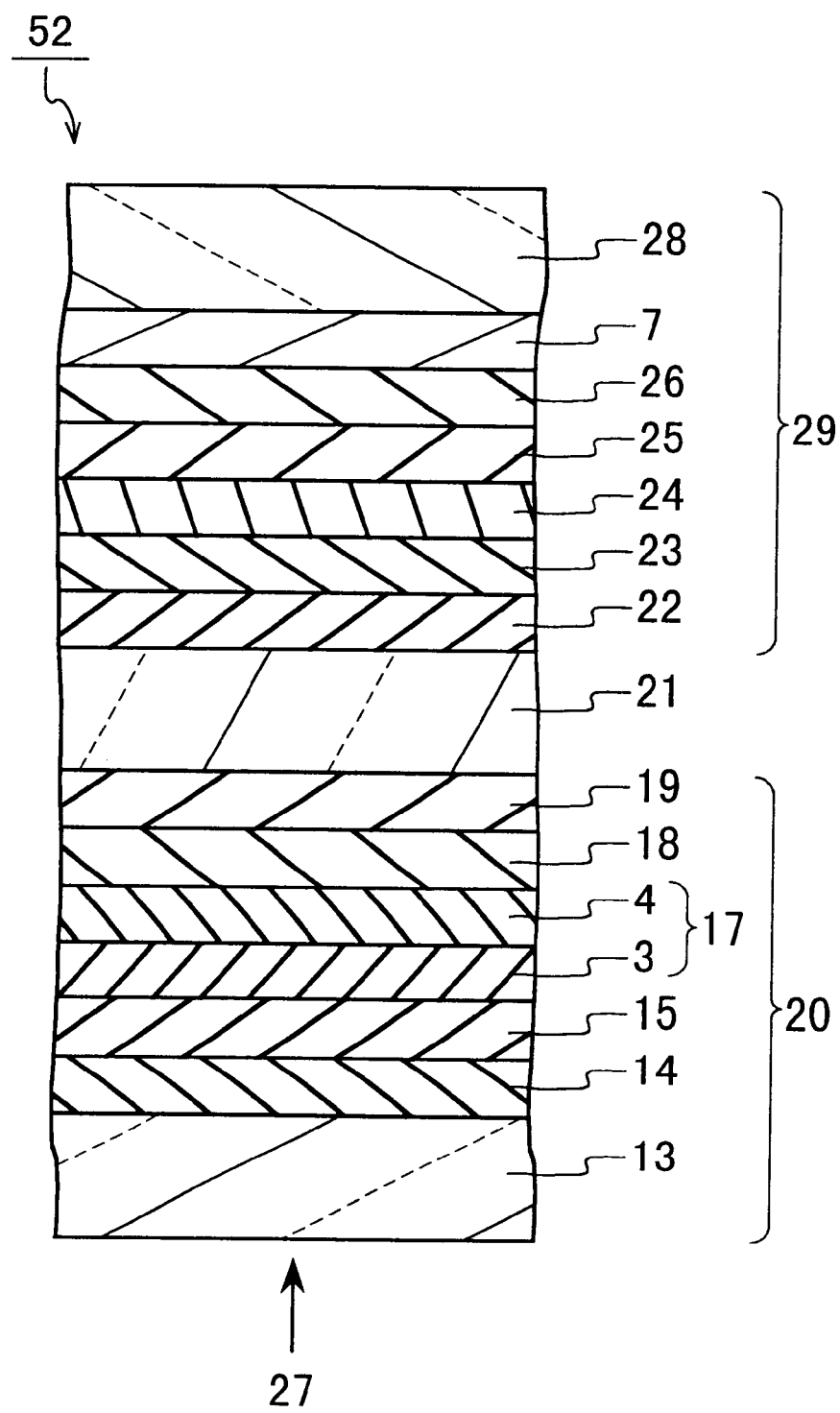
FIG. 3 is a cross-sectional view showing an example of the structure of a portion of a two-layered information recording medium of the present invention.

FIG. 3 is an example of the structure of a two-layered information recording medium 52 of the present invention where a first information recording medium 20 and a second information recording medium 29 are attached. Laser light 27 is incident from the side of a first substrate 13 and recording/reproducing is performed on one side of each of the information recording media 20 and 29, so that it is not necessary to reverse the medium and the medium can have twice as much recording/reproducing capacitance.

The same types of materials as those of the substrate 1 in FIG. 1 can be used for the first substrate 13 and the second substrate 28.

The same types of materials as those of the protective layers 2 and 6 in FIG. 1 can be used for the first protective layers 14 and 19 and the second protective layers 22 and 26.

The same types of materials as those of the interface layers 10 and 11 in FIG. 2 can be used for the first interface layers 15 and 18 and the second interface layers 23 and 25.

The crystallization-ability improving layer 3 of the present invention is formed on the first optical information recording medium 20, and can be formed of a material of the same type as described with reference to FIG. 1.

Recording/reproducing on the second information recording medium 29 is performed by the laser light 27 that has passed through the first information recording medium 20. Therefore, the second information recording medium 20 is optically designed so that the transmission thereof is as high as possible. For this reason, the phase change layer 4 of the information medium 20 is designed to be as thin as about 5 nm to about 8 nm. It is preferable that the crystallization-ability improving layer 3 also is as thin as 1 nm to 3 nm. Since the phase change layer 4 is thin, large laser energy is required in the initialization process. However, forming the crystallizationability improving layer 3 even as thin as 1 nm facilitates crystallization of the phase change layer 4, so that the laser energy can be reduced significantly. When the crystallization-ability improving layer 3 having a thickness of 3 nm is formed, the phase change layer 4 is in the crystalline state after the formation.

For the second recording layer 24, a material selected from the materials as described for the phase change layer 4 can be used.

The first recording layer 17 of the present invention has the same function as that of the recording layer 5 in FIG. 1.

For a separating layer 21, it is preferable to use a transparent material having high heat-resistance and adhesiveness in a wavelength λ of the laser light 27 in order to perform recording/reproducing on each of the first information recording medium 20 and the second information medium 29 by laser light 27. More specifically, for example, an adhesive resin such as an ultraviolet curable resin, an adhesive tape having two adhesive faces, a dielectric film or a combination thereof can be used. The thickness of the separating layer 21 is required to be more than the depth of focus, for example, 2 μm or more. With this thickness, when signal information is recorded/reproduced on either one of the first information recording medium 20 and the second information recording medium 29, signal information recorded in the other information recording medium can be prevented from being disturbed or mixed. Moreover, the total of the thickness of the separating layer and the substrate thickness is required to be within the range of the tolerance of the substrate thickness, for example, 100 μm or less, so that the laser light 27 can reach both of the first information recording medium 20 and the second information recording medium 29.

For the reflection layer 7, the same materials as described with reference to FIG. 1 can be used.

Hereinafter, the present invention will be described by way of the examples that do not require initialization and where information can be recorded in the as-depo amorphous state with reference to FIGS. 5 to 7.

Figure 5:
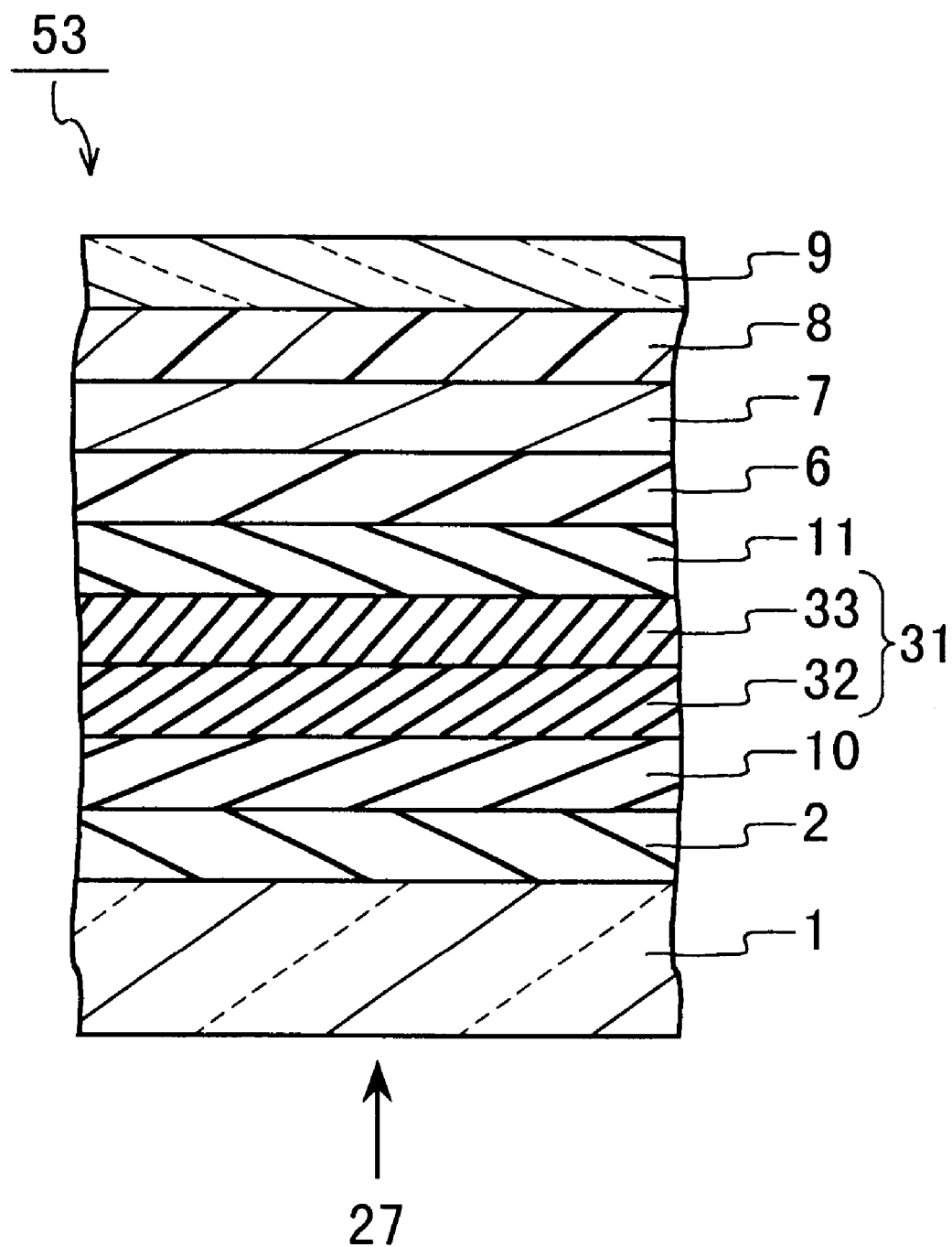
FIG. 5 is a cross-sectional view showing another example of the structure of a portion of the information recording medium of the present invention.

FIG. 5 shows an example of the structure of an information recording medium 53 of the present invention. The information recording medium 53 includes a protective layer 2, an interface layer 10, a crystal nucleus supplying layer 32, a phase change layer 33, an interface layer 11, a protective layer 6 and a reflection layer 7 laminated sequentially on a substrate 1 in this order. A dummy substrate 9 is attached thereto with an adhesive layer 8. A recording layer 31 includes the crystal nucleus supplying layer 32 and the phase change layer 33 laminated in this order from the side of the substrate 1 (which also applies to the following embodiments).

The recording layer 31 includes the crystal nucleus supplying layer 32 and the phase change layer 33 laminated above the substrate 1. The crystal nucleus supplying layer 32 is intended to facilitate the crystallization of the phase change layer 33. The phase change layer 33 is intended to undergo a phase change reversibly between the crystalline state and the amorphous state, and information is recorded by this phase change. In the information recording medium 53, since the recording layer 31 has the above-described structure, crystallization is caused in the phase change layer 33 more readily from the interface with the crystal nucleus supplying layer 32.

In order to cause crystallization in the phase change layer 33 more readily, it is preferable that the crystal nucleus supplying layer 32 has a lower crystallization temperature (transition temperature from the amorphous phase to the crystalline phase) than that of the phase change layer 33, and is formed of a material whose crystalline state is stable. In other words, the crystallization temperature Tx1 (° C.) of the crystal nucleus supplying layer 32 and the crystallization temperature Tx2 (° C.) of the phase change layer 33 satisfies the relationship: Tx2>Tx1 (which also applies to the following embodiments).

The phase change layer 33 is formed of a material in which a phase change is caused reversibly between the crystalline state and the amorphous state by irradiation of light beams. The phase change layer 33 can be formed of a chalcogen based material, for example. More specifically, among chalcogen materials, it is preferable to use a material comprising at least one selected from the group consisting of GeTe, GeSbTe, TeSnSe, InSbTe, GeBiTe and AgInSbTe for the phase change layer 33. Alternatively, for the phase change layer 33, a material comprising GeSbTe and at least one element selected from the group consisting of Ag, Sn, Cr, Pb, Bi, Pd, Se, In, Ti, Zr, Au, Pt, Al, Mn, Cu and N can be used. Among the Ge—Sb—Tb based materials, in particular, the GeTe—$Sb_2Te_3$ quasi-binary based composition, which is a high speed crystallization material, is preferable because it ensures good recording/erasing performance. In this case, the composition range of GeTe:$Sb_2Te_3$=1–6:1 is preferable for practical use because of its excellent phase stability. The crystallization temperature of the phase change layer 33 is from about 140° C. to about 240° C. and the melting point thereof is from about 600° C. to about 650° C. The crystal structure of the phase change layer 33 is NaCl type in the case of the crystallization by laser irradiation. The phase change layer 33 is in the amorphous state when it is formed, and it can be recorded in the as-depo amorphous state. The thickness of the phase change layer 33 is at least 3 nm and not more than 20 nm, for example.

Therefore, a material comprising Te is preferable for the crystal nucleus supplying layer 32, and a material comprising at least one selected from the group consisting of SnTe and PbTe is most preferable.

In the case where the crystal nucleus supplying layer 32 is formed on the laser incident side of the phase change layer 33, as the information recording medium 53, light beams reach the crystal nucleus supplying layer 32 first and are absorbed thereby. Therefore, it is preferable that the melting point of the crystal nucleus supplying layer 32 is higher than that of the phase change layer 33. In other words, it is preferable that the melting point Tm1 (° C.) of the crystal nucleus supplying layer 32 and the melting point Tm2 (° C.) of the phase change layer 33 satisfies the relationship: Tm1>Tm2. This is preferable because when recording signals by irradiating the phase change layer 33 with laser beams having a high power, the crystal nucleus supplying layer 32 is prevented from being molten at the same time, so that the function as the crystal nucleus supplying layer is not impaired in the process of melting and quenching. Table 1 shows the crystallization temperature and the melting point of materials comprising Te as a material for the crystal nucleus supplying layer 32.

TABLE 1

| Crystal nucleus supplying layer material | Crystallization temperature (° C.) | Melting point (° C.) |
| --- | --- | --- |
| $Sb_2Te_3$ | 150 | 620 |
| $Bi_2Te_3$ | <25 | 590 |
| Sb | 145 | 620 |
| Te | <25 | 450 |
| SnTe | <25 | 806 |
| PbTe | <25 | 920 |
| GeSbTe eutectic | 120 | 593 |
| GeBiTe eutectic | <25 | 552 |

As shown in Table 1, SnTe and PbTe are particularly preferable as the material for the crystal nucleus supplying layer in view of the melting point.

Since it is preferable that the crystal nucleus supplying layer 32 is stable in the crystalline state, the thickness of the crystal nucleus supplying layer 32 is preferably 2 nm or more, more preferably is larger than that (because when it is thin, the number of atoms is insufficient for crystallization). However, when the crystal nucleus supplying layer 32 is thick, energy beams are absorbed by the crystal nucleus supplying layer 32, so that the energy beams do not reach the phase change layer 33. Therefore, the thickness of the crystal nucleus supplying layer 32 is preferably 2 nm to 4 nm.

The crystal nucleus supplying layer 32 can be formed by sputtering from a basic material in an Ar gas or an Ar—$N_2$ mixed gas atmosphere. In this case, in order for the phase change layer 33 to be in the as-depo amorphous state, it is preferable that the film-forming rate of the phase change layer 33 is about 30 nm/min. or more. According to the experiments of the inventors of the present invention, in the case where the thickness of the crystallization-ability improving layer is 5 nm and the thickness of the recording layer is 10 nm, the recording layer is crystallized in the process of being formed when the film-forming rate of the recording layer is 5 nm/min to 20 nm/min. When the rate is 30 nm/min to 40 nm/min, a mixed state of the as-depo amorphous phase and the crystalline phase is attained. When the rate is 50 nm/min, the recording layer results in the as-depo amorphous state. Even if the crystal nucleus supplying layer 32 is present as in the reversible phase changeable optical information recording medium 10, if the film-forming rate of the phase change layer 33 is slow, the phase change layer 33 may be crystallized during the formation. Although the film-forming rate that allows the phase change layer 33 to be crystallized during the formation is varied depending on the combination of the thickness of the crystal nucleus supplying layer 32 and the thickness of the phase change layer 33, the film-forming rate of the phase change layer 33 preferably is 30 nm/min or more, and more preferably is 40 nm/min more in order to prevent the crystallization of the phase change layer 33.

In the information recording medium 53, when any material of SnTe, SnTe-M (where M comprises at least one selected from the group consisting of N, Ag, Cu, Co, Ge, Mn, Nb, Ni, Pd, Pt, Sb, Se, Ti, V, Zr and PbTe), PbTe, $Sb_2Te_3$, $Bi_2Te_3$, Te, GeSbTe eutectic, or GeBiTe eutectic is used as the crystal nucleus supplying layer 32, information can be recorded in the phase change layer 33 in the as-depo amorphous state (as-depo recording). In particular, when a material comprising SnTe or PbTe, which has a high melting point, is used, good results are obtained.

When any material that comprises at least one selected from the group consisting of GeTe, GeSbTe, TeSnSe, InSbTe, GeBiTe, AgInSbTe and GeSbTe and, in addition, at least one selected from the group consisting of Ag, Sn, Cr, Pb, Bi, Pd, Se, In, Ti, Zr, Au, Pt, Al, Mn and N is used, the as-depo recording is possible.

As described above, the information recording medium 53 makes the as-depo recording possible.

Figure 6:
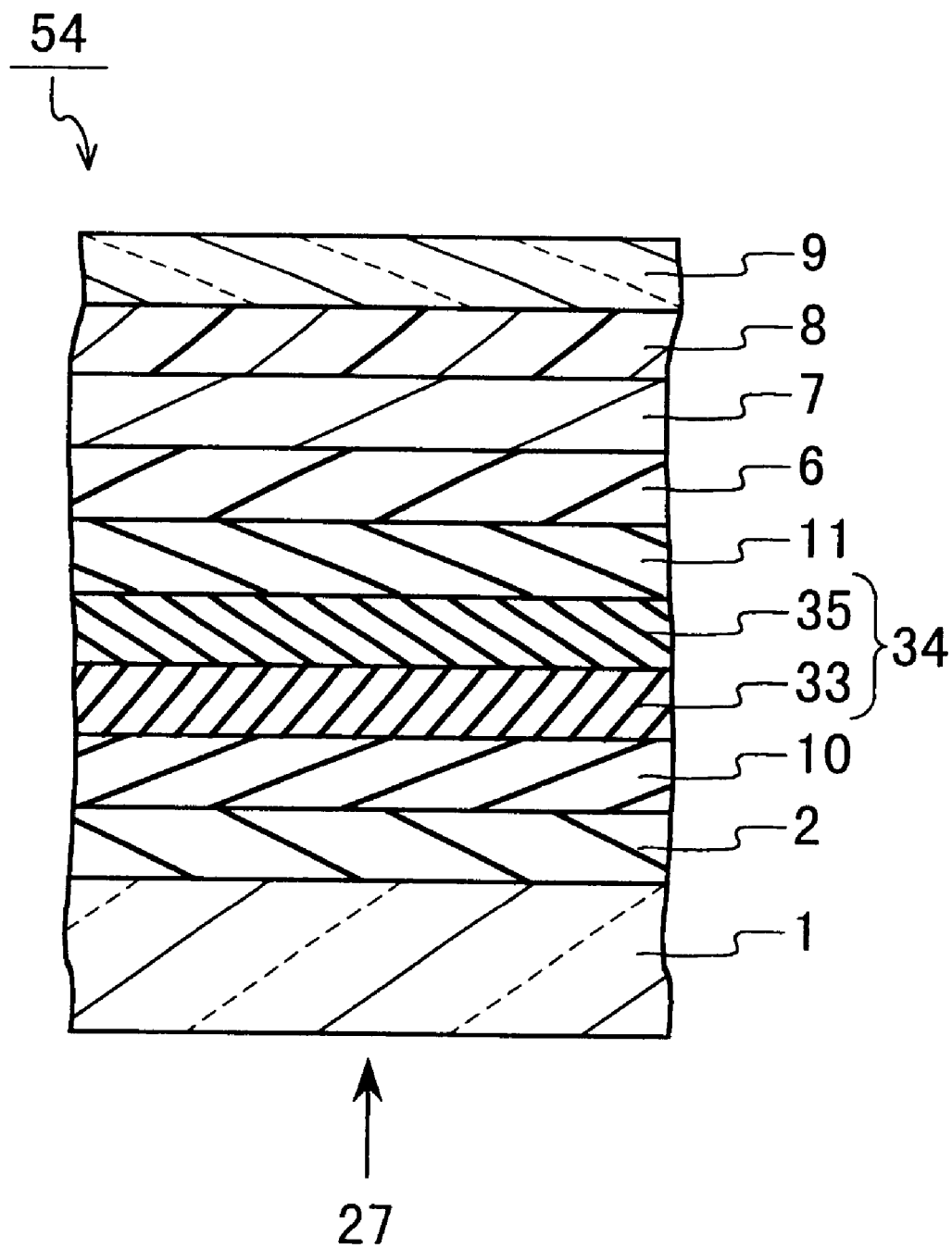
FIG. 6 is a cross-sectional view showing still another example of the structure of a portion of the information recording medium of the present invention.

FIG. 6 is a cross-sectional view showing an example of the structure of an information recording medium 54 of the present invention. The information recording medium 54 includes a protective layer 2, an interface layer 10, a recording layer 34, an interface layer 11, a protective layer 6 and a reflection layer 7 laminated sequentially on a substrate 1 in this order. A dummy substrate 9 is attached thereto with an adhesive layer 8, which is formed on the reflection layer 7. The recording layer 34 includes the phase change layer 33 and the crystal nucleus supplying layer 35 laminated in this order from the side of the substrate 1. The portions other than the recording layer 34 are the same as those of the information recording medium 53 described with reference to FIG. 5. Therefore, a duplicated description is omitted.

The functions of the recording layer 34, the crystal nucleus supplying layer 35 and the phase change layer 33 are the same as those of the recording layer 31, the crystal nucleus supplying layer 32 and the phase change layer 33 described with reference to FIG. 5, respectively. The crystal nucleus supplying layer 35 is intended to facilitate the crystallization of the phase change layer 33. The phase change layer 33 is intended to undergo phase change reversibly between the crystal state and the amorphous state, and information is recorded by the phase change. In the information recording medium 54, since the recording layer 34 has the above-described structure, crystallization in the phase change layer 33 is caused more readily from the interface with the crystal nucleus supplying layer 35.

In the information recording medium 54, unlike the information recording medium of the FIG. 5, the recording layer 34 includes the phase change layer 33 and the crystal nucleus supplying layer 35 laminated in this order from the substrate 1 side.

The phase change layer 33 is similar to the phase change layer 33 of the information recording medium 53.

Unlike the crystal nucleus supplying layer 32 of the information recording medium 53, the crystal nucleus supplying layer 35 is laminated on the side opposite to the laser incident side with respect to the phase change layer 33. Therefore, a material having a lower melting point than that of the phase change layer 33 also can be used suitably for the crystal nucleus supplying layer 35. More specifically, in addition to the materials for the crystal nucleus supplying layer 32 described with reference to FIG. 5, not only SnTe and PbTe, but also $Sb_2Te_3$, $Bi_2Te_3$, Te, a GeSbTe eutectic composition or a GeBiTe eutectic composition can be used suitably as the material comprising Te. Furthermore, in the information recording medium 54, since energy beams pass through the phase change layer 33 and then are incident on the crystal nucleus supplying layer 35, the crystal nucleus supplying layer 35 can be thicker than that of the information recording medium 53. More specifically, the thickness of the crystal nucleus supplying layer 35 is preferably about 2 nm to 5 nm. Furthermore, the film-forming rate of the phase change layer 33 is preferably about 30 nm/min or more so that the phase change layer 33 is in the amorphous state after the formation.

In the information recording medium 54, when any material of SnTe, SnTe-M (where M comprises at least one selected from the group consisting of N, Ag, Cu, Co, Ge, Mn, Nb, Ni, Pd, Pt, Sb, Se, Ti, V, Zr and PbTe), PbTe, $Sb_2Te_3$, $Bi_2Te_3$, Te, GeSbTe eutectic, or GeBiTe eutectic is used as the crystal nucleus supplying layer 35, information can be recorded in the phase change layer 33 in the as-depo amorphous state (as-depo recording). In the information recording medium 54, good results are obtained with any of the materials described above.

When any material that comprises at least one selected from the group consisting of GeTe, GeSbTe, TeSnSe, InSbTe, GeBiTe, AgInSbTe and GeSbTe and, in addition, at least one selected from the group consisting of Ag, Sn, Cr, Pb, Bi, Pd, Se, In, Ti, Zr, Au, Pt, Al, Mn and N is used as the phase change layer 33, the as-depo recording is possible.

As described above, the information recording medium 54 in FIG. 6 provides the same effect as the information recording medium 53.

Figure 7:
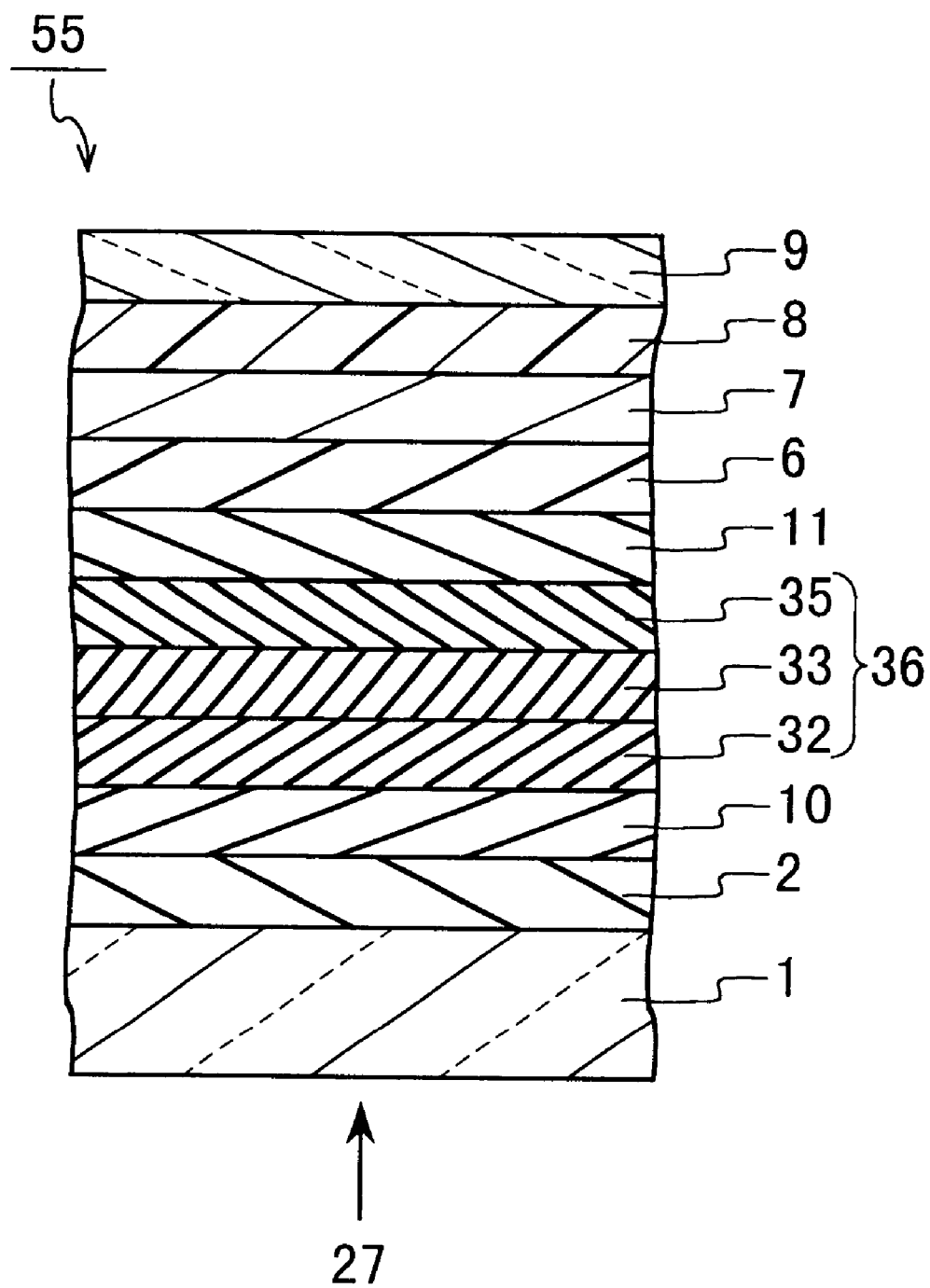
FIG. 7 is a cross-sectional view showing yet another example of the structure of a portion of the information recording medium of the present invention.

FIG. 7 shows an example of the structure of an information recording medium 55 of the present invention. The information recording medium 55 includes a protective layer 2, an interface layer 10, a recording layer 36, an interface layer 11, a protective layer 6 and a reflection layer 7 laminated sequentially on a substrate 1 in this order. A dummy substrate 9 is attached thereto with an adhesive layer 8, which is formed on the reflection layer 7. The recording layer 36 includes the crystal nucleus supplying layer 32, the phase change layer 33 and the crystal nucleus supplying layer 35 laminated in this order from the side of the substrate 1. The portions other than the recording layer 36 are the same as those of the information recording medium 53 described with reference to FIG. 5. Therefore, a duplicated description is omitted.

The crystal nucleus supplying layers 32 and 35 have the same functions as those of the crystal nucleus supplying layer 32 described with reference to FIG. 5. The crystal nucleus supplying layers 32 and 35 are intended to facilitate the crystallization of the phase change layer 33. In the information recording medium 55, since the recording layer 36 has the above-described structure, crystallization in the phase change layer 33 is caused more readily from the interface with the crystal nucleus supplying layers 32 and 35.

In the information recording medium 55, unlike the information recording medium 53 of the FIG. 5, the phase change layer 33 is interposed between the crystal nucleus supplying layers 32 and 35.

The phase change layer 33 is formed of a material that is described for the phase change layer 33 in FIG. 5.

The same materials as those for crystal nucleus supplying layer 32 described with reference to FIG. 5 can be used for the crystal nucleus supplying layer 32. For the crystal nucleus supplying layer 32, it is preferable to use a material having a higher melting point than that of the phase change layer 33 among the materials comprising Te.

The same materials as those for the crystal nucleus supplying layer 35 described with reference to FIG. 6 can be used for the crystal nucleus supplying layer 35. For the crystal nucleus supplying layer 35, a material having a lower melting point than that of the phase change layer 33 also can be used suitably for the crystal nucleus supplying layer 35 among the materials comprising Te.

The materials for the crystal nucleus supplying layers 32 and 35 can be different. For example, the crystal nucleus supplying layer 32 can be formed of SnTe, and the crystal nucleus supplying layer 35 can be formed of PbTe. Furthermore, the crystal nucleus supplying layer 32 can be formed of PbTe, and the crystal nucleus supplying layer 35 can be formed of a GeBiTe eutectic composition. However, it is advantageous that the crystal nucleus supplying layers 32 and 35 are formed of the same material, because the number of basic materials are reduced during film-formation, and the forming apparatus can be simplified.

The thicknesses of the crystal nucleus supplying layers 32 and 35 can be different, but preferably the total thickness of both the layers is 5 nm or smaller. For example, the thickness of the crystal nucleus supplying layer 32 can be 1 nm, and the thickness of the crystal nucleus supplying layer 35 can be 2 nm. Alternatively, the thickness of the crystal nucleus supplying layer 32 can be 2 nm, and the thickness of the crystal nucleus supplying layer 35 can be 3 nm.

In the information recording medium 55, when any material of SnTe, SnTe-M (where M comprises at least one selected from the group consisting of N, Ag, Cu, Co, Ge, Mn, Nb, Ni, Pd, Pt, Sb, Se, Ti, V, Zr and PbTe), PbTe, $Sb_2Te_3$, $Bi_2Te_3$, Te, GeSbTe eutectic, or GeBiTe eutectic is used as the crystal nucleus supplying layers 32 and 35, as-depo recording is possible. In particular, a material comprising SnTe or PbTe, which has a high melting point, is used, good results are obtained.

When any material that comprises at least one selected from the group consisting of GeTe, GeSbTe, TeSnSe, InSbTe, GeBiTe, AgInSbTe and GeSbTe and, in addition, at least one selected from the group consisting of Ag, Sn, Cr, Pb, Bi, Pd, Se, In, Ti, Zr, Au, Pt, Al, Mn and N is used, as-depo recording is possible.

As described above, the information recording medium 55 in FIG. 7 provides the same effect as the information recording medium 53.

The information recording media in FIGS. 5 to 7 are designed to attain Ra>Rc, and signals can be recorded on the phase change layer 33 in the as-depo amorphous state without the initialization process.

Next, an example of a method for manufacturing the information recording medium of the present invention will be described.

The method for manufacturing the information recording medium of the present invention, the information recording medium including a recording layer, includes forming a recording layer comprising a phase change layer in which a phase change is caused reversibly between the crystalline state and the amorphous state and a crystal nucleus supplying layer laminated on the phase change layer that facilitates the crystallization of the phase change layer. Hereinafter, a method for manufacturing the information recording medium 53 in FIG. 5 will be described with reference to FIG. 5.

First, a protective layer 2 and an interface layer 10 are formed on a substrate 1. These layers can be formed by reactive sputtering from targets (metal basic materials) of the materials thereof in an Ar gas and a reactive gas atmosphere, or by sputtering from compound basic materials in an Ar gas atmosphere or an Ar gas and a reactive gas atmosphere.

Next, a crystal nucleus supplying layer 32 and a phase change layer 33 are laminated on the interface layer 10. The crystal nucleus supplying layer 32 and the phase change layer 33 can be formed by sputtering from a basic material in an Ar gas or an Ar—$N_2$ mixed gas atmosphere. The phase change layer 33 is formed under the conditions that achieves the amorphous state. In order for the phase change layer 33 to be in the as-depo amorphous state after the formation, as described with reference to FIG. 5, it is preferable that the film-forming rate is about 30 nm /min or more.

Next, an interface layer 11 and a protective layer 6 are laminated on the phase change layer 33. These layers can be formed in the same manner as the protective layer 2 and the interface layer 10.

Next, a reflection layer 7 is formed on the protective layer 6. The reflection layer 7 can be formed by sputtering or vapor deposition.

Finally, an adhesive layer 8 is applied onto the reflection layer 7 by spin-coating. A dummy substrate 9 is attached thereto, and irradiated with ultraviolet rays to cure the adhesive layer 8. Thus, the information recording medium 53 can be produced.

The information recording media 54 and 55 can be produced easily by the same method as above.

The method for manufacturing an information recording medium allows the information media of the present invention to be produced easily.

Next, an example of a method for recording/reproducing information on an information recording medium will be described.

The recording/reproducing method of the present invention uses any one of the information recording media shown in FIGS. 5 to 7.

More specifically, signals are recorded by irradiating any one of the information recording media shown in FIGS. 5 to 7 with a modulated laser beam so as to form an amorphous region and a crystalline region in the phase change layer. Irradiating the amorphous region in the phase change layer with a laser beam at a low power makes the irradiated portion of the amorphous region become crystallized. On the other hand, irradiating the crystalline region in the phase change layer with a laser beam at a high power makes the irradiated portion of the crystalline region become amorphous.

The recording/reproducing method of the present invention allows reliable recording of information signals. In particular, as-depo recording is possible by using any one of the information recording media shown in FIGS. 5 to 7.

EXAMPLES

Next, the present invention will be described more specifically.

Examples 1 to 13 are intended to eliminate initialization and to form a phase change layer in the crystalline state when the formation is complete.

Examples 14 to 26 are intended to eliminate initialization and to record information on the phase change layer that is in the as-depo amorphous state. Example 26 is directed to reliability.

Example 1

Figure 4A:
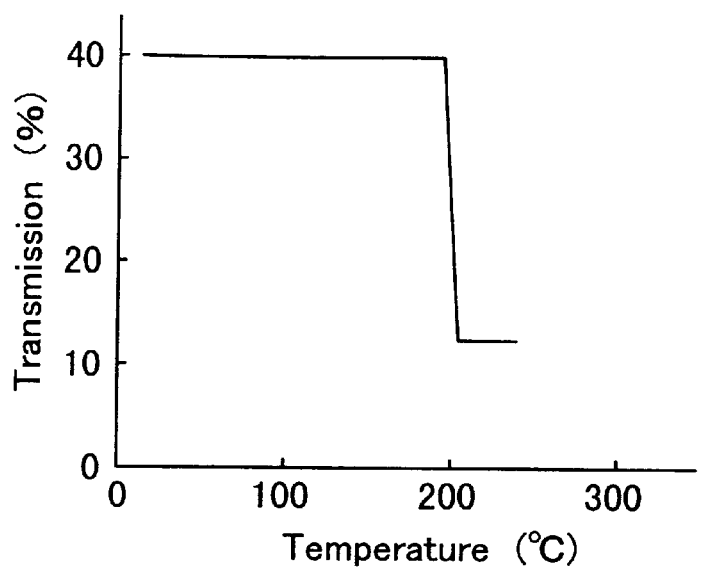
FIGS. 4A to 4C are graphs showing the temperature dependence of the transmission for determining the phase structure of a crystallization-ability improving layer or a recording layer laminated on the crystallization-ability improving layer of the present invention. In the graphs, the temperature on the horizontal axis is plotted against the transmission on the vertical axis.
Figure 4B:
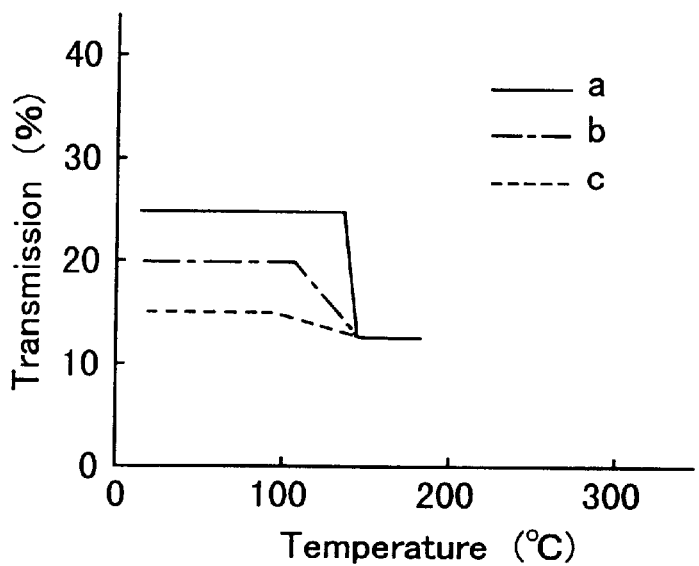
Figure 4C:
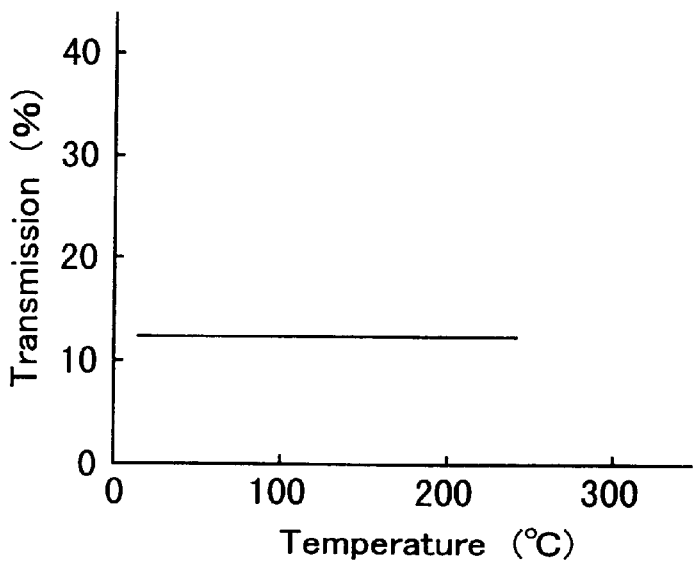

For the function as the crystallization-ability improving layer to crystallize the phase change layer during the formation, it is preferable that the crystallization-ability improving layer itself be crystalline after its formation. Several high-speed materials or materials having a low melting point whose crystals are structurally stable were selected and the phase structures thereof after formation were investigated. The materials were $Bi_2Te_3$, $Sb_2Te_3$, Sb, Te, SnTe, PbTe, GeSbTe eutectic, and GeBiTe eutectic. Thin films, each of which was 5 nm thick, were formed on quartz substrates with respect to the eight materials by DC sputtering from sputtering targets of a diameter of 100 mm and a thickness of 6 mm (hereinafter, represented by 100 mm φ×6 mm t) in an Ar atmosphere. The transmissions of the obtained eight thin films were measured while the films were warmed at a rate of 50° C./min by a He—Ne laser. FIGS. 4A to 4C show the relationship between the temperature and the transmission. If the structure is amorphous after the film-formation, the transmission is relatively high at room temperature, and a sharp drop due to the phase change to the crystalline phase is observed at a temperature in the process of increasing the temperature, as shown in FIG. 4A. This temperature is defined as the crystallization temperature. In the case where the structure is a mixed state of an amorphous state and a crystalline state after the film-formation, the transmission at room temperature is lower that that of FIG. 4A, and a slight change in the transmission is observed in the process of increasing the temperature, as shown in FIG. 4B. The crystallization temperature is lower than that of FIG. 4A, and crystallization is caused more readily than the state of FIG. 4A. Lines a, b, and c in FIG. 4B show the transmissions of the films with different proportions of the crystalline state and the amorphous state. Line a is of the film containing the crystalline phase in the highest proportion, and line c shows the film containing it in the lowest proportion of the three films. When the structure after the film-formation is crystalline, the transmission at room temperature is the lowest, and substantially no change in the transmission is observed even if the temperature is raised, as shown in FIG. 4C. Such difference can be used to determine the phase structure. Table 2 shows the structure of the eight thin films.

TABLE 2

| Crystallization-ability improving layer | Phase structure of crystallization-ability improving layer at room temperature |
|---|---|
| $Bi_2Te_3$ | crystalline phase |
| $Sb_2Te_3$ | mixed phase of amorphous and crystalline phases |
| Sb | mixed phase of amorphous and crystalline phases |
| Te | crystalline phase |
| SnTe | crystalline phase |
| PbTe | crystalline phase |
| GeSbTe eutectic | mixed phase of amorphous and crystalline phases |
| GeBiTe eutectic | crystalline phase |

Example 2

The thin films of Example 1 were investigated as to whether or not they function as the crystallization-ability improving layer. A crystallization-ability improving layer was formed on a quartz substrate in a vacuum chamber, and a phase change layer was formed thereon successively so as to prepare a sample. Then, the phase structure of the sample was investigated. The thickness was as follows: the quartz/ the crystallization-ability improving layer (5 nm)/the phase change layer (10 nm). The sputtering conditions of the crystallization-ability improving layer were the same as those in Example 1. The material for the phase change layer was $Ge_2Sb_2Te_5$. The phase structure of the phase change layer was investigated by measuring the transmission as in Example 1.

TABLE 3

| crystallization-ability improving layer | Phase structure of phase change layer at room temperature |
|---|---|
| not provided | amorphous phase |
| $Bi_2Te_3$ | mixed phase of amorphous and crystalline phases |
| $Sb_2Te_3$ | mixed phase of amorphous and crystalline phases |
| Sb | amorphous phase |
| Te | mixed phase of amorphous and crystalline phases |
| SnTe | crystalline phase |
| PbTe | crystalline phase |
| GeSbTe eutectic | mixed phase of amorphous and crystalline phases |
| GeBiTe eutectic | crystalline phase |

In the case where the crystallization-ability improving layer was not provided, the $Ge_2Sb_2Te_5$ phase change layer was amorphous, and the transmission change was the same as shown in FIG. 4A. The crystallization temperature was about 200° C. When Sb was used as the crystallization-ability improving layer, the crystallization temperature was not dropped, and crystallization or generation of a crystal nucleus was not observed. When $Bi_2Te_3$, $Sb_2Te_3$, Te, or GeSbTe eutectic was used as the crystallization-ability improving layer, the phase change layer was in a mixed state of the amorphous phase and the crystalline phase. When SnTe, PbTe or GeBiTe eutectic was used as the crystallization-ability improving layer, the results were similar to those shown in FIG. 4C, and crystallization in the phase change layer was observed. These results confirmed that when a telluride was used as the crystallization-ability improving layer, the crystallization in the phase change layer was accelerated. Furthermore, it became evident that a material having a halite type crystal structure had a larger crystallization effect among the tellurides.

Example 3

The relationship between the thickness and the crystallization effect was investigated with SnTe as the crystallization-ability improving layer. The films were formed of SnTe on quartz substrates while changing the thickness from 1 nm to 20 nm. Then, the phase change layer 10 nm thick was formed thereon. Table 4 shows the structures of the phase change layers of the thus obtained samples.

TABLE 4

| Thickness of SnTe film (nm) | Phase structure of phase change layer |
|---|---|
| 1 | mixed phase of amorphous and crystalline phases |
| 3 | substantially crystalline phase |
| 5 | crystalline phase |
| 7 | crystalline phase |
| 10 | crystalline phase |
| 15 | crystalline phase |
| 20 | crystalline phase |

When the thickness is 1 nm, the structure was in a mixed state of amorphous phase and crystalline phase. However, the crystallization was caused more readily than when the crystallization-ability improving layer was not provided. When the thickness was 3 nm or more, the phase change layer was crystallized.

Example 4

The conditions under which the phase change layer was formed and the crystallization effect were investigated. A SnTe film 5 nm thick was formed on a quartz substrate, and the phase change layer 10 nm thick was formed thereon at varied rates at which the film was formed. Table 5 shows the structures of the phase change layers of these samples.

TABLE 5

| Film-forming rate of phase change layer (nm/min) | Phase structure of phase change layer |
|---|---|
| 5 | crystalline phase |
| 7 | crystalline phase |
| 10 | crystalline phase |
| 20 | substantially crystalline phase |
| 30 | mixed phase of amorphous and crystalline phases |
| 40 | mixed phase of amorphous and crystalline phases |
| 50 | substantially amorphous phase |
| 60 | amorphous phase |

The results indicate that the effect provided by the crystallization-ability improving layer of crystallizing the phase change layer depends on the film-forming rate. When the film-forming rate was from 5 nm/min to 20 nm/min, the phase change layer was crystallized. When the film-forming rate was from 30 nm/min to 40 nm/min, the phase change layer was in a mixed state of the amorphous phase and the crystalline phase. The phase change layer was amorphous at a rate higher than that. The lower the film-forming rate of the phase change layer is, the more readily the phase change layer is crystallized. The most preferable rate was 5 nm/min to 10 nm/min.

Example 5

The complex refractive index of SnTe was experimentally obtained. The results were a refractive index n of 4.2 and an extinction coefficient k of 4.5. Samples were prepared by determining the structure of an optical information recording medium by optical calculation with this complex refractive index. The reflectance of the optical information recording medium was measured so as to examine whether or not the phase change layer was crystallized.

As shown in FIG. 1, a protective layer 100 nm thick, a crystallizationability improving layer 5 nm thick, a phase change layer 18 nm thick, a protective layer 25 nm thick and a reflection layer 80 nm thick were formed on a polycarbonate substrate successively in this order in a vacuum chamber with a batch type sputtering apparatus. Table 6 shows the specific conditions under which the films were formed.

TABLE 6

Disk 1

| Layer | thickness (nm) | Base material | Sputtering gas | Sputtering pressure (mTorr) | Sputtering power (W) |
|---|---|---|---|---|---|
| protective layer | (100) | ZnS-20 mol % SiO$_2$ | Ar | 0.5 | RF500 |
| crystallization-ability improving layer | (5) | SnTe | Ar | 1 | DC50 |
| recording layer | (18) | GeSbTe | Ar + N$_2$ | 1 | DC30 |
| protective layer | (25) | Ge | Ar + N$_2$ | 10 | RF300 |
| reflection layer | (80) | AlCr | Ar | 3 | DC200 |

The reflectance of the optical information recording medium was measured by a phase changeable optical disk evaluation apparatus manufactured by PULSTEC INDUSTRIAL CO., LTD. The light source has a wavelength of 660 nm and NA of 0.6. The optical information recording medium was rotated at a linear velocity of 8 m/s, and the reflectance at the position at a radius of 40 mm in the mirror face portion was measured, and the result was a reflectance of 20%.

In order to investigate whether or not the crystallization was complete, the same position was irradiated with a laser beam with a power sufficient for usual crystallization, and then the reflectance was measured. In this case, the reflectance was 20.3%. It was verified that the phase change layer was crystallized substantially completely after the formation. The same effect was observed with respect to PbTe and GeBiTe eutectic.

Example 6

A measurement was performed regarding the changes in the reflectance and the recording sensitivity of the optical information recording medium when only the thickness of the crystallization-ability improving layer was changed in the multilayered film structure of Example 5. SnTe was used for the crystallization-ability improving layer. The reflectance was measured under the same conditions as in Example 5, and the recording sensitivity was defined as a recording power that provides a CNR value of 50 dB when a 3T signal was recorded between grooves one time. Table 7 shows the results.

TABLE 7

| Disk No. | Thickness of crystallization-ability improving layer (nm) | Reflectance (%) | Recording sensitivity (mW) |
|---|---|---|---|
| Disk 2 | 1 | 15.2 | 8.3 |
| Disk 3 | 3 | 17.6 | 9.4 |
| Disk 1 | 5 | 20.0 | 10.6 |
| Disk 4 | 7 | 23.5 | 11.4 |
| Disk 5 | 10 | 27.6 | 12.6 |
| Disk 6 | 15 | 34.8 | >14.0 |
| Disk 7 | 20 | 41.3 | >14.0 |

The thicker the crystallization-ability improving layer was, the larger the reflectance of the multilayered film was. However, the thicker the crystallization-ability improving layer was, the lower the recording sensitivity was. When the thickness was 15 nm or more, a recording power of 14 mW or more was required, which is unsuitable for practical use. As a result, a preferable thickness of the crystallization-ability improving layer is from 1 to 10 nm.

Example 7

The overwrite jitter characteristics of the optical information recording medium produced in Example 5 were evaluated. For comparison, the overwrite jitter characteristics of the optical information recording medium without the crystallization-ability improving layer in a conventional structure that had been subjected to the crystallization process by a semiconductor laser were evaluated. The changes of the jitter value were examined by recording a 3T signal between grooves one to 20 times. Table 8 shows the results.

TABLE 8

| | Jitter value (%) | |
|---|---|---|
| The number of times of recording | Disk 1 Crystallization-ability improving layer is provided. Initialization process is not performed. | Disk 8 Crystallization-ability improving layer is not provided. Initialization process is performed. |
| 1 | 9.8 | 9.7 |
| 2 | 10.2 | 9.8 |
| 3 | 10.3 | 9.8 |
| 4 | 10.1 | 9.7 |
| 5 | 9.9 | 9.7 |
| 10 | 9.9 | 9.7 |
| 20 | 9.8 | 9.7 |

The jitter values in Table 8 is the average of the front-end jitter value and the rear-end jitter value of the recording mark.

The difference between the front-end jitter value and the rear-end jitter value was within 0.5% regardless of the number of times of recording.

When the crystallization of the phase change layer was insufficient so that a portion thereof was amorphous, the jitter value was increased around at the time of the $2^{nd}$ to $4^{th}$ recording. In this example, even if recording was performed on the optical information recording medium in which the phase change layer was crystallized in the middle of the formation with the crystallization-ability improving layer, the jitter value was not increased around at the time of the $2^{nd}$ to $4^{th}$ recording. The crystalline phase was substantially comparable to that of a conventional recording film crystallized by irradiating it with a semiconductor laser after the film was formed.

Example 8

The effect provided by the crystallization-ability improving layer was examined by using the structure of the first information recording medium of the two-layered information recording medium in FIG. 3. A protective layer 100 nm thick, an interface layer 5 nm thick, a crystallization-ability improving layer 3 nm thick, a phase change layer 7 nm thick, an interface layer 5 nm, and a protective layer 90 nm thick were formed on a polycarbonate substrate successively in this order in a vacuum chamber with a batch type sputtering apparatus. Information recording media with seven different materials for the crystallization-ability improving layer and an information recording medium without the crystallization-ability improving layer were prepared. At the same time, sample pieces including the multilayered film having the same structure formed on quartz substrates also were produced. The phase structure of the phase change layer after the formation was examined by using the sample pieces. When $Bi_2Te_3$, $Sb_2Te_3$, Te, or GeSbTe eutectic was used, the structure was a mixed state of the amorphous phase and the crystalline phase. Since they were not completely amorphous, the optical information recording medium was irradiated with a semiconductor laser beam for crystallization in order to evaluate the ease of crystallization. In the case where the crystallization-ability improving layer was not provided, the power of the semiconductor laser required by initialization was 800 mW. This was the substantial upper limit of the laser output. Table 9 shows the results when the crystallization-ability improving layer was used.

TABLE 9

| Disk No. | Crystallization-ability improving layer | Phase structure of phase change layer | Laser power for initialization (mW) |
|---|---|---|---|
| Disk 9 | not provided | amorphous | 800 |
| Disk 10 | $Bi_2Te_3$ | mixed phase of amorphous and crystalline phases | 430 |
| Disk 11 | $Sb_2Te_3$ | mixed phase of amorphous and crystalline phases | 470 |
| Disk 12 | Te | mixed phase of amorphous and crystalline phases | 440 |
| Disk 13 | SnTe | crystalline phase | — |
| Disk 14 | PbTe | crystalline phase | — |
| Disk 15 | GeSbTe eutectic | mixed phase of amorphous and crystalline phases | 420 |
| Disk 16 | GeBiTe eutectic | crystalline phase | — |

Even if the phase change layer was not in the complete crystalline phase, providing the crystallization-ability improving layer even 3 nm thick reduced the power for initialization, so that the crystallization was made easy. The same effect was obtained with the crystallization-ability improving layer 1 nm thick.

Example 9

With respect to the structure having the light-absorption layer as shown in FIG. 2, the same examination as in Example 5 was performed.

A $ZnS-SiO_2$ protective layer 120 nm thick, a GeN interface layer 5 nm thick, a SnTe crystallization-ability improving layer 5 nm thick, a GeSbTe phase change layer 10 nm thick, a GeN interface layer 5 nm, a $ZnS-SiO_2$ protective layer 50 nm thick, a light-absorption correcting layer 30 nm thick made of an Si alloy, and a reflection layer 80 nm made of an Ag alloy were formed on a polycarbonate substrate so as to prepare an information recording medium. When the film formation was complete, the phase change layer was crystallized by the effect of the crystallization-ability improving layer, and the reflectance obtained was 17.0%. The same position was irradiated with a semiconductor laser beam, and then the reflectance was measured. Then, the reflectance was 16.9%. This verified that the phase change layer was in the completely crystallized state after the film-formation. The crystallization-ability improving layer provided the effect in the structure in FIG. 2.

Example 10

In the examples up to Example 9, a telluride was used as the crystallization-ability improving layer and the excellent effect was provided. However, since the crystallization-ability improving layer absorbs light, the thickness is limited to be as small as 5 nm or less. Therefore, it was investigated whether or not a halogenide having small light absorption and comprising a compound having a halite type structure has the function as the crystallization-ability improving layer. The materials are nine F compounds, which are $ZnF_2$, $AlF_3$, KF, $CaF_2$, NaF, $BaF_2$, $MgF_2$, $LaF_3$, and LiF. A sputtering target of 100 mm $\phi \times 6$ mm t of each of the compounds was subjected to RF sputtering in an Ar gas atmosphere so as to form a thin film 10 nm thick on a quartz substrate. Then, a phase change layer 10 nm thick was formed thereon so as to prepare a sample. The phase structure of the formed phase change layer was examined. In the same manner in Example 1, the transmission was measured while heating at a rate of 50° C. /min by a He—Ne laser. As a result of determining the phase structure of the nine samples from FIGS. 4A to 4C, all the samples had a mixed phase of the amorphous phase and the crystalline phase. Although all the samples exhibited the transmission change as shown in FIG. 4B, the materials having a halite type structure, LiF, NaF, and KF exhibited the transmission change close to that indicated by line b. The transmission change of the other materials was close to that indicated by line a. The material having a halite type structure used as the crystallization-ability improving layer allowed the proportion of the crystalline phase in the phase change layer to be larger, and had a higher effect as the crystallization-ability improving layer than the other materials.

Example 11

A halogenide 10 nm thick was formed as the crystallization-ability improving layer, and the same examination as in Example 8 was performed. Table 10 shows the results.

TABLE 10

| Disk No. | Crystallization-ability improving layer | Phase structure of phase change layer | Laser power for initialization (mW) |
|---|---|---|---|
| Disk 17 | not provided | amorphous phase | 800 |
| Disk 18 | $ZnF_2$ | mixed phase of amorphous and crystalline phases | 550 |
| Disk 19 | $AlF_3$ | mixed phase of amorphous and crystalline phases | 530 |
| Disk 20 | KF | mixed phase of amorphous and crystalline phases | 460 |
| Disk 21 | $CaF_2$ | mixed phase of amorphous and crystalline phases | 570 |
| Disk 22 | NaF | mixed phase of amorphous and crystalline phases | 440 |
| Disk 23 | $BaF_2$ | mixed phase of amorphous and crystalline phases | 570 |

TABLE 10-continued

| Disk No. | Crystallization-ability improving layer | Phase structure of phase change layer | Laser power for initialization (mW) |
|---|---|---|---|
| Disk 24 | $MgF_2$ | mixed phase of amorphous and crystalline phases | 580 |
| Disk 25 | $LaF_3$ | mixed phase of amorphous and crystalline phases | 600 |
| Disk 26 | LiF | mixed phase of amorphous and crystalline phases | 420 |

Even if the phase change layer was in a mixed state of the amorphous phase and the crystalline phase, the laser power for initialization was significantly reduced, compared with the case where the crystallization-ability improving layer was not provided. Providing the crystallization-ability improving layer made of a halogenide reduces the energy required for crystallization. The crystallization-ability improving layer made of the halogen compound also facilitates the crystallization of the phase change layer.

Example 12

The complex refractive index of LiF, NaF and KF, which had a high function as the crystallization-ability improving layer, was determined. A crystallization-ability improving layer of each of the materials was formed on a quartz substrate. The thickness was measured with a step meter. The reflectance and the transmission thereof were measured by a spectrometer so as to obtain the complex refractive index. Table 11 shows the obtained complex refractive indexes.

TABLE 11

| Crystallization-ability improving layer | n-ki |
|---|---|
| LiF | 1.41-0.00I |
| NaF | 1.48-0.00I |
| KF | 1.52-0.00I |

These films were transparent and had k=0.

Example 13

A measurement was performed regarding the changes in the reflectance and the recording sensitivity of the optical information recording medium when only the thickness of the crystallization-ability improving layer was changed in the multilayered film structure of Example 8. LiF was used for the crystallization-ability improving layer. Table 12 shows the results.

TABLE 12

| Crystallization-ability improving layer (nm) | Reflectance (%) | Recording sensitivity (mW) |
|---|---|---|
| 1 | 13.6 | 7.5 |
| 5 | 15.2 | 8.3 |
| 10 | 16.8 | 9.3 |
| 15 | 18.2 | 10.4 |
| 20 | 20.1 | 12.5 |
| 25 | 22.4 | 14.0 |
| 30 | 25.0 | >14.0 |

The thicker the crystallization-ability improving layer was, the larger the reflectance of the multilayered film was.

When the thickness was 1 nm, the reflectance was less than 15%. When the thickness was more than 25 nm, the recording sensitivity was 14 mW or more. These results indicate that a preferable thickness of the crystallization-ability improving layer made of the halogenide is from 5 nm to 20 nm. Compared with the results of Example 6, a smaller k of the crystallization-ability improving layer itself allows the thickness of the crystallization-ability improving layer to be set larger.

In the above examples, the effects of the crystallization-ability improving layer of FIGS. 1, 2 and 3 were described. However, the present invention is not limited to these structures, and the effects can be obtained regardless of the thickness of the protective layer or the presence or the absence of the interface layer, as long as the crystallization-ability improving layer is formed before the phase change layer is formed.

As described above, the present invention allows the phase structure of the phase change layer after the formation to be in the crystalline phase by forming the crystallization-ability improving layer at the substrate side interface of the phase change layer, so that the crystallization process that requires thermal means can be eliminated, or crystallization can be caused with a smaller power.

Example 14

In Example 14, the materials for the crystal nucleus supplying layer were examined.

In order to start recording of information in the as-depo state without initializing the phase change layer, recording is required to be performed while crystallizing the as-depo amorphous portion. Therefore, it is necessary that a crystal nucleus can be generated easily in the as-depo amorphous phase change layer. The larger the number of crystal nuclei generated, the lower the transition temperature (crystallization temperature) from the amorphous phase to the crystalline phase becomes. As the material for the crystal nucleus supplying layer, several materials are selected from materials having NaCl type crystalline phase structure, high speed-crystallization materials and materials having a low melting point, and the crystallization temperature of the phase change layer laminated on these materials was investigated.

The materials were $Bi_2Te_3$, $Sb_2Te_3$, Sb, Te, SnTe, PbTe, SnTe—PbTe, SnTe—Ag, SnTe—Se, SnTeN, GeSbTe eutectic, GeBiTe eutectic, TiN, and ZrN. The material for the phase change layer was GeSbTe.

A sample having a layer structure of a quartz substrate/crystal nucleus supplying layer (thickness of 2 nm)/phase change layer (thickness of 10 nm) was used. The crystal nucleus supplying layers made of the material other than SnTeN, TiN and ZrN were formed by DC sputtering from a sputtering target of a diameter of 100 mm and a thickness of 6 mm in an Ar gas atmosphere. The crystal nucleus supplying layers made of SnTeN, TiN and ZrN were formed by RF-sputtering from the sputtering targets of SnTe, Ti and Zr in an Ar—$N_2$ mixed gas atmosphere. The phase change layer made of GeSbTe was formed by DC sputtering from a target in an Ar gas atmosphere.

Furthermore, a sample without the crystal nucleus supplying layer was produced. The transmission of the samples with and without the crystal nucleus supplying layer was measured while the samples were warmed at a rate of 50° C./min by a He—Ne laser.

When the phase change layer reaches the crystallization temperature, the transmission of the sample drops sharply.

The change in the transmission indicates the crystallization temperature. Table 13 shows results of measuring the crystallization temperatures of the samples.

TABLE 13

| Crystal nucleus supplying layer | Crystallization temperature of phase change layer (° C.) |
|---|---|
| not provided | 192 |
| $Sb_2Te_3$ | 154 |
| $Bi_2Te_3$ | 142 |
| Sb | 192 |
| Te | 180 |
| SnTe | 170 |
| SnTe-PbTe | 159 |
| SnTe-Ag | 172 |
| SnTe-Se | 173 |
| SnTe-N | 170 |
| PbTe | 166 |
| GeSbTe eutectic | 158 |
| GeSbTe eutectic | 146 |
| TiN | 192 |
| ZrN | 192 |

When the crystal nucleus supplying layer was not provided, the crystallization temperature of the GeSbTe phase change layer was 192° C. when the material comprising Te was used as the crystal nucleus supplying layer, the crystallization temperature of the phase change was reduced, and it is believed that the material has an effect on generation of crystal nuclei. Although the crystalline phase of TiN and ZrN has a NaCl type structure, the effects on generation of crystal nuclei were not observed. Sb provided no effects.

Example 15

In Example 15, the information recording medium 53 was produced by using the materials that provided the effect on generation of crystal nuclei in Example 14, and as-depo recording was performed. One example thereof will be described.

ZnS-20 mol % $SiO_2$ (80 mol % ZnS-20 mol % $SiO_2$, which also applies to the following examples) as a protective layer, a GeN interface layer 5 nm thick, a crystal nucleus supplying layer 2 nm thick, a GeSbTe phase change layer 10 nm thick, a GeN interface layer 5 nm thick, a ZnS-20 mol % $SiO_2$ protective layer, and a reflection layer made of an Ag alloy were formed on a polycarbonate substrate having a guide groove in this order successively. After the formation of the films, the Ag alloy was coated with an ultraviolet curable resin by spin-coating and attached to a dummy substrate. $Bi_2Te_3$, $Sb_2Te_3$, Te, SnTe, SnTe—PbTe, SnTe—Ag, SnTe—Se, SnTeN, PbTe, GeSbTe eutectic, or GeBiTe eutectic was used as the material for the crystal nucleus supplying layer.

Next, the conditions under which the films were formed of these materials will be described. The ZnS-20 mol % $SiO_2$ layer was formed by RF-sputtering from ZnS-20 mol % $SiO_2$ as the basic material in an Ar gas atmosphere. The GeN layer was formed by RF-sputtering from Ge as the basic material in an Ar—$N_2$ mixed gas atmosphere. The crystal nucleus supplying layer was formed under the same conditions as in Example 1. The phase change layer made of GeSbTe was formed by DC-sputtering from GeSbTe as the basic material in an Ar—$N_2$ mixed gas atmosphere. The reflection layer made of an Ag alloy was formed by DC-sputtering from the Ag alloy as the basic material in an Ar gas atmosphere. For the information recording medium of Example 15, the thicknesses of the two protective layers were determined precisely so that Ra was about 28% and Rc was about 10%.

Figure 8:
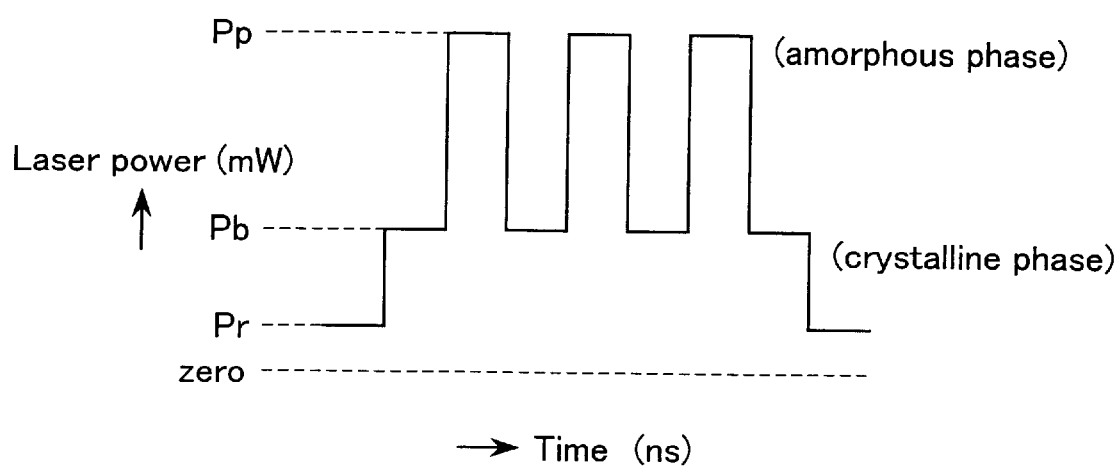
FIG. 8 is a diagram showing modulated waveforms of laser beams used for recording by the method for recording/reproducing information on the information recording medium of the present invention. In the diagram, the horizontal axis shows time and the vertical axis shows laser power.

The reversibly phase changeable optical information recording medium of Example 2 was evaluated with a drive for evaluation on which a laser having λ=660 nm and NA=0.6 was mounted. The amplitude, the noise level and the CNR of a 3T signal on a groove were evaluated. The evaluation was performed at a linear velocity of 8.2 m/s in the portion irradiated with a laser beam. Recording was performed by modulating the laser beam between a high power Pp(mW) and a low power Pb(mW). FIG. 8 shows the modulated waveform for recording. The amorphous phase and the crystalline phase were formed by modulating the laser beam, regardless of the initial state (as-depo amorphous state, initialized crystalline state or recorded state), so that new information was recorded. Pr(mW) represents the reproducing power.

An as-depo amorphous region that was not initialized (non-initialized as-depo amorphous region) and a crystalline region that was initialized (initialized crystalline region) were formed on the same plane by initializing a circular region in a portion of the information recording medium. Then, it was determined whether or not as-depo recording was possible by comparing the CNRs between the two regions. In each medium, Ra was about 28% and Rc was about 10%, so that addresses were read satisfactorily, the servo characteristics were stable, and thus it was possible to evaluate the CNRs in both regions. A 3T signal was recorded once. Table 14 shows the evaluation results.

TABLE 14

| Information recording medium No. | Crystal nucleus supplying layer material | 3T signal CNR (dB) non-initialized region | initialized region |
|---|---|---|---|
| 2-01 | not provided | 29.4 | 52.5 |
| 2-02 | $Sb_2Te_3$ | 47.5 | 52.3 |
| 2-03 | $Bi_2Te_3$ | 49.1 | 52.0 |
| 2-04 | Te | 46.5 | 51.5 |
| 2-05 | SnTe | 53.3 | 52.6 |
| 2-06 | SnTe-PbTe | 53.3 | 52.4 |
| 2-07 | SnTe-Ag | 53.6 | 52.6 |
| 2-08 | SnTe-Se | 53.5 | 52.8 |
| 2-09 | SnTe-N | 53.2 | 52.4 |
| 2-10 | PbTe | 53.4 | 52.6 |
| 2-11 | GeSbTe eutectic | 48.1 | 52.1 |
| 2-12 | GeBiTe eutectic | 49.4 | 52.0 |

As shown in Table 14, in the case where a material comprising SnTe or a material comprising PbTe is used, the CNR in the as-depo amorphous region and the CNR in the crystalline region were substantially at the same level. However, the as-depo amorphous region, which had a lower noise level by about 1 dB, had a higher CNR than that in the crystalline region. It is believed that noise is slightly increased by initialization. In the case where other materials comprising Te is used, the CNR in the as-depo amorphous region was 45 dB or more, which was about 3 dB to 5 dB lower than that in the crystalline region. The above-described results confirmed that the as-depo recording can be performed on the media formed of the above-described materials.

The melting point of GeSbTe as the phase change layer is about 620° C., and the melting points of materials other than SnTe and PbTe as the crystal nucleus supplying layers are about 620° C. or lower. Therefore, the reason why the CNR of the media formed of the materials other than SnTe and PbTe is lower by several dB is believed that the crystal nucleus supplying layer is molten and mixed with the phase change layer during recording, so that the optical characteristics were changed. Therefore, in the structures where the phase change layer is formed after the crystal nucleus supplying layer, it is more preferable that the crystal nucleus supplying layer is formed of a material comprising SnTe or PbTe.

Example 16

In Example 16, an information recording medium 54 was produced with a material that provided an effect on generation of crystal nuclei in Example 14, and as-depo recording was performed.

A ZnS-20 mol % $SiO_2$ protective layer, a GeN interface layer 5 nm thick, a GeSbTe phase change layer 10 nm thick, a crystal nucleus supplying layer 2 nm thick, a GeN interface layer 5 nm thick, a ZnS-20 mol % $SiO_2$ protective layer, and a reflection layer made of an Ag alloy were formed on a polycarbonate substrate having a guide groove successively in this order. After formation, the Ag alloy was coated with an ultraviolet ray curable resin by spin-coating and attached to a dummy substrate. $Bi_2Te_3$, $Sb_2Te_3$, Te, SnTe, SnTe—PbTe, SnTe—Ag, SnTe—Se, SnTeN, PbTe, GeSbTe eutectic or GeBiTe eutectic was used for the crystal nucleus supplying layer. The layers were formed using the same conditions as in Example 15.

A non-initialized as-depo amorphous region and an initialized crystalline region were formed on the same plane by initializing a circular region in a portion of the information recording medium. Then, it was determined whether or not as-depo recording was possible by comparing the CNR between the amorphous and crystalline states. The recording conditions and the evaluation conditions were the same as in Example 2. Table 15 shows the evaluation results.

TABLE 15

| Information recording medium | Crystal nucleus supplying layer material | 3T signal CNR (dB) | |
|---|---|---|---|
| | | non-initialized region | initialized region |
| 2-01 | not provided | 29.4 | 52.5 |
| 3-01 | $Sb_2Te_3$ | 53.1 | 52.5 |
| 2-02 | $Bi_2Te_3$ | 52.9 | 52.4 |
| 2-03 | Te | 53.1 | 52.3 |
| 2-04 | SnTe | 53.3 | 52.6 |
| 2-05 | SnTe-PbTe | 53.3 | 52.4 |
| 2-06 | SnTe-Ag | 53.6 | 52.6 |
| 2-07 | SnTe-Se | 53.5 | 52.8 |
| 2-08 | SnTe-N | 53.4 | 52.6 |
| 2-09 | PbTe | 53.4 | 52.6 |
| 2-10 | GeSbTe eutectic | 53.0 | 52.2 |
| 2-11 | GeBiTe eutectic | 52.9 | 52.4 |

Table 15 reveals that in the media formed of any of the above materials as the crystal nucleus supplying layer, the CNRs in the as-depo amorphous region and the crystalline region were in the same level, and as-depo recording was possible. Thus, in the structures where the crystal nucleus supplying layer is formed after the phase change layer, as-depo recording also can be performed on the media where the crystal nucleus supplying layer is formed of a material having a lower melting point than that of the phase change layer.

Example 17

In Example 17, the crystal nucleus supplying layer was formed of SnTe, which was confirmed to be capable of achieving the as-depo recording in Example 15, and the dependence of as-depo recording on the thickness of the crystal nucleus supplying layer and the number of times of recording were investigated. In Example 17, an information recording medium 53 was produced by the same method as in Example 15. In this case, the thickness of crystal nucleus supplying layer of the information recording medium of each sample was changed from 0 nm to 7 nm by every 0.5 nm.

A 3T signal was recorded once, twice and 10 times in the amorphous state that was not initialized. The evaluation conditions were the same as in Example 15. Table 16 shows the results of the evaluation.

TABLE 16

| Information recording medium No. | Thickness of SnTe film (nm) | 3T signal CNR (dB) | | |
|---|---|---|---|---|
| | | recording once | recording twice | recording ten times |
| 2-01 | 0.0 | 29.4 | 39.0 | 53.5 |
| 4-01 | 0.5 | 32.2 | 41.1 | 53.2 |
| 4-02 | 1.0 | 32.0 | 43.0 | 53.4 |
| 4-03 | 1.5 | 39.5 | 49.2 | 53.3 |
| 2-05 | 2.0 | 53.2 | 53.3 | 53.4 |
| 4-04 | 2.5 | 53.4 | 53.2 | 53.2 |
| 4-05 | 3.0 | 53.2 | 53.4 | 53.5 |
| 4-06 | 3.5 | 53.3 | 53.2 | 53.2 |
| 4-07 | 4.0 | 53.4 | 53.1 | 53.3 |
| 4-08 | 4.5 | 51.1 | 51.0 | 50.0 |
| 4-09 | 5.0 | 49.7 | 49.8 | 48.8 |
| 4-10 | 5.5 | 48.5 | 48.6 | 47.5 |
| 4-11 | 6.0 | 47.2 | 47.1 | 46.1 |
| 4-12 | 6.5 | 45.3 | 45.2 | 44.3 |
| 4-13 | 7.0 | 42.3 | 42.5 | 41.4 |

As shown in Table 16, when the thickness of the crystal nucleus supplying layer was 2 nm or more, a substantially saturated CNR was obtained even by recording once. When the thickness was as small as 1.5 nm or less, the amplitude was small in recording once, and since the noise level was high in recording twice, the CNR was low. The noise level became lower as recording was performed more times. Seven-times recording was required to obtain a saturated CNR. When the thickness was 4.5 nm or more, a saturated CNR was not obtained at a recording power of 15 mW. The results indicate that when the crystal nucleus supplying layer is thick, the recording sensitivity of the phase change layer is dropped. The thickness of the crystal nucleus supplying layer that achieved the as-depo recording and provided good recording sensitivity was about 2 nm to 4 nm.

Therefore, in the information recording medium of Example 17, a preferable thickness of the crystal nucleus supplying layer is about 2 nm to 4 nm.

Example 18

In Example 18, the same experiments as in Example 17 were conducted with respect to the information recording medium 54.

A ZnS-20 mol % $SiO_2$ protective layer, a GeN interface layer 5 nm thick, a GeSbTe phase change layer 10 nm thick, a SnTe crystal nucleus supplying layer, a GeN interface layer 5 nm thick, a ZnS-20 mol % $SiO_2$ protective layer, and a reflection layer made of an Ag alloy were formed on a polycarbonate substrate having a guide groove successively in this order. After formation, the Ag alloy was coated with an ultraviolet ray curable resin by spin-coating and attached to a dummy substrate. The thickness of SnTe as the crystal nucleus supplying layer was changed from 0 nm to 7 nm by every 0.5 nm. Table 17 shows the results of measuring in the same manner as in Example 17.

TABLE 17

| Information recording medium No. | Thickness of SnTe film (nm) | 3T signal CNR (dB) | | |
|---|---|---|---|---|
| | | recording once | recording twice | recording ten times |
| 2-01 | 0.0 | 29.4 | 39.0 | 53.5 |
| 5-01 | 0.5 | 32.2 | 41.1 | 53.2 |
| 5-02 | 1.0 | 32.0 | 43.0 | 53.4 |
| 5-03 | 1.5 | 39.5 | 49.2 | 53.3 |
| 3-04 | 2.0 | 53.5 | 53.4 | 53.4 |
| 5-04 | 2.5 | 53.4 | 53.2 | 53.2 |
| 5-05 | 3.0 | 53.2 | 53.4 | 53.5 |
| 5-06 | 3.5 | 53.3 | 53.2 | 53.2 |
| 5-07 | 4.0 | 53.4 | 53.1 | 53.3 |
| 5-08 | 4.5 | 53.1 | 53.2 | 53.2 |
| 5-09 | 5.0 | 53.2 | 53.2 | 53.1 |
| 5-10 | 5.5 | 49.6 | 49.5 | 49.6 |
| 5-11 | 6.0 | 48.4 | 48.5 | 48.5 |
| 5-12 | 6.5 | 46.3 | 46.2 | 46.3 |
| 5-13 | 7.0 | 43.9 | 43.8 | 44.0 |

As shown in Table 17, when the thickness of the crystal nucleus supplying layer was 2 nm or more, a substantially saturated CNR was obtained by recording once. When the thickness was 5.5 nm or more, a saturated CNR was not obtained at a recording power of 15 mW. Similarly to the results of Example 17, when the crystal nucleus supplying layer becomes thick, the recording sensitivity of the phase change layer is dropped. In the information recording medium of Example 18, the thickness of the crystal nucleus supplying layer that achieved the as-depo recording and provided good recording sensitivity was about 2 nm to 5 nm. Therefore, in the structures where the crystal nucleus supplying layer is formed after the phase change layer, a preferable thickness of the crystal nucleus supplying layer is about 2 nm to 5 nm.

Example 19

In Example 19, an example of a reversibly phase changeable optical information recording medium 55 will be described.

A ZnS-20 mol % $SiO_2$ protective layer, a GeN interface layer 5 nm thick, a SnTe crystal nucleus supplying layer 32, a GeSbTe phase change layer 10 nm thick, a SnTe crystal nucleus supplying layer 35, a GeN interface layer 5 nm thick, a ZnS-20 mol % $SiO_2$ second protective layer, and a reflection layer made of an Ag alloy were formed on a polycarbonate substrate having a guide groove successively in this order. After formation, the Ag alloy was coated with an ultraviolet ray curable resin by spin-coating and attached to a dummy substrate. As-depo recording was performed while changing the thickness of the crystal nucleus supplying layers 32 and 35 under the same conditions as in Example 17. Table 18 shows the results of the evaluation.

TABLE 18

| Information recording medium No. | Thickness of two SnTe films (nm) (nm) | 3T signal CNR (dB) | | |
|---|---|---|---|---|
| | | recording once | recording twice | recording ten times |
| 2-01 | 0.0 | 29.4 | 39.0 | 53.5 |
| 6-01 | 0.5 | 32.1 | 42.8 | 53.1 |
| 6-02 | 1.0 | 52.6 | 53.0 | 53.0 |
| 6-03 | 1.5 | 52.9 | 53.0 | 53.0 |
| 6-04 | 2.0 | 53.0 | 53.2 | 53.1 |
| 6-05 | 2.5 | 53.1 | 53.1 | 53.2 |
| 6-06 | 3.0 | 47.1 | 47.2 | 47.1 |
| 6-07 | 3.5 | 41.6 | 41.4 | 41.6 |

In the case where the phase change layer was interposed between the crystal nucleus supplying layers, as-depo recording was possible at a thickness of each of the crystal nucleus supplying layers 32 and 35 of 1 nm. When the thickness of each of the layers was 3 nm, recording sensitivity was insufficient. It is believed that when the crystal nucleus supplying layers are formed on both sides of the phase change layer, the effect on generation of nuclei is multiplied, compared with the case where crystal nucleus supplying layer is provided only on one side of the phase change layer. Therefore, in the case where crystal nucleus supplying layers are formed on both sides of the phase change layer, the thickness of the crystal nucleus supplying layer can be half, more preferably from about 1 nm to about 2 nm.

Example 20

In Example 20, an example of an examination regarding to the relationship among the thickness of the crystal nucleus supplying layer, the film-forming rate of the phase change layer and the state of the phase change layer after the formation with respect to the information recording medium 53 will be described.

A ZnS-20 mol % $SiO_2$ protective layer, a GeN interface layer 5 nm thick, a SnTe crystal nucleus supplying layer, a GeSbTe phase change layer 10 nm thick, a GeN interface layer 5 nm thick, a ZnS-20 mol % $SiO_2$ protective layer, and a reflection layer made of an Ag alloy were formed on a polycarbonate substrate having a guide groove successively in this order. After formation, the Ag alloy was coated with an ultraviolet ray curable resin by spin-coating and attached to a dummy substrate.

In the information recording media of the samples, the film-forming rate r (nm/min) of the phase change layer is different from each other, ranging from 5 nm/min to 60 nm/min. The thickness d1 of the crystal nucleus supplying layer is 2 nm or 5 nm. The information recording medium with d1=2 nm was optically designed so that the reflectance Ra in the amorphous region was about 28%, and the reflectance Rc in the crystalline region was about 10%. The information recording medium with d1=5 nm was optically designed to achieve that the reflectance Ra in the amorphous region was about 30%, and the reflectance Rc in the crystalline region was about 12%. After attachment, a circular region in a portion of the information recording medium was initialized so that a non-initialized as-depo amorphous region and an initialized crystalline region were formed on the same plane, and the reflectance was measured in the two regions.

The reflectance in a mirror portion formed on the substrate was measured with a drive for evaluation on which a laser having $\lambda=660$ nm and NA=0.6 was mounted while the focus servo mechanism was in operation at a linear velocity of 8.2 m/s. Table 19 shows the relationship between the film-forming rate and the reflectance.

TABLE 19

| Information recording medium No. | d1 (nm) | r (nm/min) | Reflectance (%) non-initialized region | Reflectance (%) initialized region |
|---|---|---|---|---|
| 7-01 | 2 | 5 | 12.3 | 10.4 |
| 7-02 | 2 | 10 | 16.4 | 10.5 |
| 7-03 | 2 | 20 | 28.2 | 10.6 |
| 2-05 | 2 | 30 | 28.4 | 10.5 |
| 7-04 | 2 | 40 | 28.4 | 10.5 |
| 7-05 | 2 | 50 | 28.3 | 10.6 |
| 7-06 | 2 | 60 | 28.4 | 10.4 |
| 7-07 | 5 | 5 | 12.6 | 12.6 |
| 7-08 | 5 | 10 | 12.5 | 12.6 |
| 7-09 | 5 | 20 | 13.6 | 12.7 |
| 7-10 | 5 | 30 | 18.4 | 12.5 |
| 7-11 | 5 | 40 | 23.5 | 12.5 |
| 7-12 | 5 | 50 | 29.6 | 12.6 |
| 7-13 | 5 | 60 | 30.7 | 12.7 |

Table 19 indicates that in the case of d1=2 nm, the reflectance in the non-initialized region is about 28% at r≧20(nm/min), so that it is determined that the state after formation is amorphous. On the other hand, the reflectance is in the 10% range at r<20(nm/min), so that it is believed that at least a portion in the phase change layer is crystallized during the formation.

In the case of d1=5 nm, the reflectance in the non-initialized region is about 30% at r≧50(nm/min), so that it is determined that the state after formation is amorphous. On the other hand, at r<50(nm/min), it is believed that at least a portion in the phase change layer is crystallized during the formation. Thus, the state of the phase change layer after formation can be determined by the film-forming rate of the phase change layer and the thickness of the crystal nucleus supplying layer. In order to form the phase change layer in the amorphous state, it is preferable that the thicker the crystal nucleus supplying layer is, the larger the film-forming rate of the phase change layer is.

Example 21

In Example 21, it is examined by using the information recording medium 53 whether or not stable servo characteristics in a drive and good address reading properties can be obtained even with an information recording medium with Rc=substantially 0%, as long as the as-depo recording can be performed thereon.

A ZnS-20 mol % SiO₂ protective layer, a GeN interface layer 5 nm thick, a SnTe crystal nucleus supplying layer 2 nm thick, a GeSbTe phase change layer 10 nm thick, a GeN interface layer 5 nm thick, a ZnS-20 mol % SiO₂ protective layer, and a reflection layer made of an Ag alloy were formed on a polycarbonate substrate having a guide groove successively in this order. After formation, the Ag alloy was coated with an ultraviolet ray curable resin by spin-coating and attached to a dummy substrate. Four types of information recording media that satisfy Ra>Rc, where Ra is the reflectance of the information recording medium when the phase change layer is amorphous, and Rc is the reflectance when the phase change layer is crystalline, were produced by determining precisely the thickness of the two protective layers.

An non-initialized as-depo amorphous region (Ra) and an initialized crystalline region (Rc) were formed on the same plane by initializing a circular region in a portion of the information recording medium. Then, the stability in the servo characteristics, the address reading properties and the CNR were evaluated. Table 20 shows the evaluation results.

TABLE 20

| Information recording medium No. | Rc (%) | Ra (%) | Crystalline region address reading | As-depo amorphous region address reading | CNR (dB) |
|---|---|---|---|---|---|
| 8-01 | 15.2 | 30.7 | good | good | 52.8 |
| 8-02 | 10.6 | 25.9 | good | good | 53.5 |
| 8-03 | 5.3 | 20.1 | poor | good | 53.9 |
| 8-04 | 0.9 | 16.2 | poor | good | 54.7 |

As shown in Table 20, in the case where the Rc of the information recording medium was 5.3%, it was difficult to read addresses in the initialized crystalline region. In the case where the Rc was 0.9%, it was difficult to operate the tracking servo mechanism in the initialized crystalline region.

On the other hand, the servo characteristics were stable and the address reading properties were good at Rc>10%. Thus, when the information recording medium that was optically designed to achieve Ra>Rc is initialized, the lower limit of Rc is restricted. On the other hand, in the as-depo amorphous region that was not initialized after formation of the film, the address reading properties were good regardless of Rc. Since the reflectance of the address portion is kept at Ra if initialization is not performed, the lower limit is not restricted. Thus, when the phase change layer laminated with the crystal nucleus supplying layer is used, as-depo recording is possible, and even if Rc is near 0%, the reflectance of the address portion is Ra, which can be kept sufficiently large, so that the addresses on the information recording medium can be read and the servo characteristics can be stable. Moreover, good CNR is obtained.

Example 22

An information recording medium is produced in the same manner as in Example 21, and the reflectance thereof is measured with a laser λ=405 nm.

A ZnS-20 mol % SiO₂ protective layer, a GeN interface layer 5 nm thick, a SnTe crystal nucleus supplying layer 2 nm thick, a GeSbTe phase change layer 12 nm thick, a GeN interface layer 5 nm thick, a ZnS-20 mol % SiO₂ protective layer, and a reflection layer made of an Ag alloy were formed successively in this order to produce an information recording medium 53. After formation, the Ag alloy was coated with an ultraviolet ray curable resin by spin-coating and attached to a dummy substrate.

The complex refractive indexes of the protective layer, the interface layer, the crystal nucleus supplying layer, the phase change layer, and the reflection layer with respect to a laser beam of λ=405 nm were measured by ellipsometry, and the thickness of each layer was determined precisely so that the absolute value of ΔR (ΔR=Rc−Ra) is sufficiently large. A 3T signal is recorded once on grooves in the as-depo amorphous region and the crystalline region, and the CNR was measured.

Table 21 shows the results of the measurement.

TABLE 21

| Information recording medium No. | Rc (%) | Ra (%) | Crystalline region address reading | As-depo amorphous region address reading | CNR (dB) |
|---|---|---|---|---|---|
| 9-01 | 16.3 | 31.5 | good | good | 48.9 |
| 9-02 | 11.4 | 26.1 | good | good | 49.8 |
| 9-03 | 5.7 | 21.0 | poor | good | 51.0 |
| 9-04 | 1.2 | 15.6 | poor | good | 52.5 |

As-depo recording was possible even at a short wavelength of $\lambda=405$ nm. When as-depo recording was possible, the servo characteristics were stable and the address reading properties were good, even if the Rc was low. Thus, when the phase change layer laminated with the crystal nucleus supplying layer is used, as-depo recording is possible with a short wavelength laser beam and can be performed for high density recording.

Example 23

In Example 23, as-depo recording is performed on an information recording medium 53 comprising AgInSbTe as the phase change layer.

A ZnS-20 mol % $SiO_2$ protective layer, a GeN interface layer 5 nm thick, a SnTe crystal nucleus supplying layer, an AgInSbTe phase change layer 10 nm thick, a GeN interface layer 5 nm thick, a ZnS-20 mol % $SiO_2$ protective layer, and a reflection layer made of an Ag alloy were formed on a polycarbonate substrate having a guide groove successively in this order. The ZnS-20 mol % $SiO_2$ layer was formed by RF-sputtering from ZnS-20 mol % $SiO_2$ as the basic material in an Ar gas atmosphere. The GeN layer was formed by RF-sputtering from Ge as the basic material in an Ar—$N_2$ mixed gas atmosphere. The crystal nucleus supplying layer was formed by DC-sputtering from the basic material in an Ar gas atmosphere. The AgInSbTe layer was formed by DC-sputtering from AgInSbTe as the basic material in an Ar gas atmosphere. The layer made of an Ag alloy was formed by DC-sputtering from the Ag alloy as the basic material in an Ar gas atmosphere. After formation, the Ag alloy layer was coated with an ultraviolet ray curable resin by spin-coating and attached to a dummy substrate. The information recording media of the samples include crystal nucleus supplying layers with different thickness. The thicknesses ranged from 0 nm to 7 nm by every 0.5 nm. Furthermore, a 3T signal was recorded in the as-depo amorphous state once, twice and 10 times. Table 22 shows the results.

TABLE 22

| Information recording medium No. | Thickness of SnTe film (nm) | 3T signal CNR (dB) | | |
|---|---|---|---|---|
| | | recording once | recording twice | recording ten times |
| 11-01 | 0.0 | 26.8 | 35.8 | 53.0 |
| 11-02 | 0.5 | 32.2 | 41.1 | 53.0 |
| 11-03 | 1.0 | 32.0 | 43.0 | 52.9 |
| 11-04 | 1.5 | 39.5 | 49.2 | 53.0 |
| 11-05 | 2.0 | 52.5 | 53.0 | 53.1 |
| 11-06 | 2.5 | 52.8 | 52.9 | 53.0 |
| 11-07 | 3.0 | 53.0 | 53.1 | 53.0 |
| 11-08 | 3.5 | 53.0 | 53.0 | 53.0 |
| 11-09 | 4.0 | 52.9 | 53.0 | 53.1 |
| 11-10 | 4.5 | 51.8 | 52.1 | 52.0 |

TABLE 22-continued

| Information recording medium No. | Thickness of SnTe film (nm) | 3T signal CNR (dB) | | |
|---|---|---|---|---|
| | | recording once | recording twice | recording ten times |
| 11-11 | 5.0 | 49.8 | 49.1 | 50.0 |
| 11-12 | 5.5 | 48.1 | 48.0 | 48.3 |
| 11-13 | 6.0 | 46.8 | 46.7 | 46.9 |
| 11-14 | 6.5 | 44.6 | 44.7 | 44.6 |
| 11-15 | 7.0 | 42.3 | 42.5 | 42.4 |

As shown in Table 22, when the thickness of the crystal nucleus supplying layer was 2 nm or more, a substantially saturated CNR was obtained even by recording once. When the thickness was as small as 1.5 nm or less, the amplitude was small in recording once, and since the noise level was high in recording twice, the CNR was low. The noise level became lower as recording was performed a larger number of times. Seven-times recording was required to obtain a saturated CNR. When the thickness was 4.5 nm or more, a saturated CNR was not obtained at a recording power of 15 mW. The results indicate that the thicker the crystal nucleus supplying layer is, the lower the recording sensitivity of the phase change layer is. The thickness of the crystal nucleus supplying layer that achieved the as-depo recording and provided good recording sensitivity was about 2 nm to 4 nm. Also when AgInPbTe was used for the phase change layer, as-depo recording was possible, and the effect of SnTe as the crystal nucleus supplying layer was confirmed.

It is reported that AgInSbTe is a mixture of InSb and $AgSbTe_2$, and therefore it is believed that since $AgSbTe_2$ is of NaCl type structure, the generation of crystal nuclei is accelerated by SnTe.

Example 24

In Example 24, an information recording medium 53 comprising GeSbTe added with either of Ag, Sn, Cr, Pb, Bi, Pd, Se, In, Ti, Zr, Au, Pt, Al or Mn as the phase change layer was produced.

A ZnS-20 mol % $SiO_2$ protective layer, a GeN interface layer 5 nm thick, a SnTe crystal nucleus supplying layer 2 nm thick, a GeSbTe+M (where M is either of Ag, Sn, Cr, Pb, Bi, Pd, Se, In, Ti, Zr, Au, Pt, Al and Mn) phase change layer 10 nm thick, a GeN interface layer 5 nm thick, a ZnS-20 mol % $SiO_2$ protective layer, and a reflection layer made of an Ag alloy were formed on a polycarbonate substrate having a guide groove successively in this order. After formation, the Ag alloy was coated with an ultraviolet ray curable resin by spin-coating and attached to a dummy substrate.

Table 23 shows the results of recording in the as-depo state with respect to the above samples. In Table 23, ($\Delta$CNR (dB))=(CNR (dB) at the $10^{th}$ recording))–(CNR (dB) at the first recording).

TABLE 23

| Information recording medium No. | Added element | $\Delta$CNR (dB) |
|---|---|---|
| 12-01 | Ag | 0.5 |
| 12-02 | Sn | 0.0 |
| 12-03 | Cr | 0.8 |
| 12-04 | Pb | 0.1 |
| 12-05 | Bi | 0.5 |

TABLE 23-continued

| Information recording medium No. | Added element | ΔCNR (dB) |
|---|---|---|
| 12-06 | Pd | 0.3 |
| 12-07 | Se | 0.4 |
| 12-08 | In | 0.8 |
| 12-09 | Ti | 0.2 |
| 12-10 | Zr | 0.1 |
| 12-11 | Au | 0.3 |
| 12-12 | Pt | 0.1 |
| 12-13 | Al | 0.1 |
| 12-14 | Mn | 0.2 |

As shown in Table 23, a substantially saturated CNR was obtained even at the first recording, even if any of the above elements was added to GeSbTe. Therefore, also when a material represented by a composition formula GeSbTe+M is used as the phase change layer, as-depo recording is possible.

Example 25

In Example 25, as-depo recording was performed on information recording media 53 where the phase change layers had different thickness.

A ZnS-20 mol % $SiO_2$ protective layer, a GeN interface layer 5 nm thick, a SnTe crystal nucleus supplying layer 2 nm thick, a GeSbTe phase change layer, a GeN interface layer 5 nm thick, a ZnS-20 mol % $SiO_2$ protective layer, and a reflection layer made of an Ag alloy were formed on a polycarbonate substrate having a guide groove successively in this order. The thickness of the phase change layer was changed in the range from 2 nm to 25 nm. After formation, the Ag alloy was coated with an ultraviolet ray curable resin by spin-coating and attached to a dummy substrate. After attachment, a non-initialized as-depo amorphous region and an initialized crystalline region were formed on the same plane by initializing a circular region in a portion of the information recording medium.

The conditions under which recording was performed and the conditions under which evaluation was performed were the same as in Example 15. The CNR was measured by recording a 3T signal on a groove once in each of the two regions. Table 24 shows the results of the measurement.

TABLE 24

| Information recording medium No. | Phase change layer thickness (nm) | 3T signal CNR (dB) as-depo amorphous region | 3T signal CNR (dB) crystalline region |
|---|---|---|---|
| 13-01 | 2 | recording impossible | not crystallized |
| 13-02 | 3 | 46.0 | 46.8 |
| 13-03 | 5 | 52.4 | 52.6 |
| 13-04 | 7 | 53.3 | 53.2 |
| 13-05 | 9 | 53.1 | 53.2 |
| 13-06 | 11 | 53.4 | 53.3 |
| 13-07 | 15 | 53.0 | 53.1 |
| 13-08 | 20 | 49.8 | 50.6 |
| 13-09 | 25 | 43.5 | 44.7 |

As shown in Table 24, when the thickness of the phase change layer was 2 nm, crystallization was not caused. When the thickness of the phase change layer was 3 nm or more, as-depo recording was possible. However, at 25 nm, the CNR was not saturated with a recording power of 15 mW, and recording sensitivity was insufficient. For as-depo recording, the range for practical use of the thickness of the phase change layer is from 3 nm to 20 nm, and a preferable thickness is 5 nm to 15 nm.

Example 26

In Example 26, the effect of the crystal nucleus supplying layer on reliability of the recording characteristics was examined with respect to the information recording medium 53.

A ZnS-20 mol % $SiO_2$ protective layer, a GeN interface layer 5 nm thick, a SnTe crystal nucleus supplying layer 2 nm thick, a GeSbTe phase change layer 10 nm, a GeN interface layer 5 nm thick, a ZnS-20 mol % $SiO_2$ protective layer, and a reflection layer made of an Ag alloy were formed on a polycarbonate substrate having a guide groove successively in this order. After formation, the Ag alloy was coated with an ultraviolet ray curable resin by spin-coating and attached to a dummy substrate. The information recording medium of Example 26 was produced in such a manner that Ra>Rc was achieved. Furthermore, the phase change layer was not initialized, and recording of a signal was started in the as-depo amorphous state.

After the information recording medium of Example 26 was produced, the medium was allowed to stand in an environment of 20% RH at 90° C. for 24 hours, and the changes in the jitter value before and after the 24 hours exposure to the environment were measured. The measurement was performed with respect to test 1, test 2 and test 3. In test 1, as-depo recording was performed and the jitter value was measured before the 24 hours exposure to the environment, and after the 24 hours exposure to the environment, the jitter value was measured. In test 2, as-depo recording was performed and the jitter change was measured before the 24 hours exposure to the environment, and after the 24 hours exposure to the environment, overwriting was performed and then the jitter value was measured. In test 3, recording was not performed before the 24 hours exposure to the environment, and after the 24 hours exposure to the environment, as-depo recording was performed and then the jitter value was measured.

The information recording media were evaluated with a laser having λ=660 nm and NA=0.6. The jitter values of a 3T signal between grooves and on a groove were evaluated. The 3T signal was recorded once. The linear velocity was 8.2 m/s. Table 25 shows the difference in the jitter between grooves between before and after the 24 hours exposure, and Table 26 shows the difference in the jitter on a groove. Herein, (the jitter difference)=(the jitter value after the exposure)−(the jitter value before the exposure).

TABLE 25

| Information recording medium No. | SnTe film thickness (nm) | Jitter difference (%) test 1 | test 2 | test 3 |
|---|---|---|---|---|
| 14-01 | 2.0 | 0.0 | 1.0 | 0.3 |

TABLE 26

| Information recording medium No. | SnTe film thickness (nm) | Jitter difference (%) | | |
|---|---|---|---|---|
| | | test 1 | test 2 | test 3 |
| 14-01 | 2.0 | 0.0 | 0.8 | 0.3 |

As shown in Tables 25–26, the jitter differences in tests 1, 2 and 3 were 2% or less in either of the cases between grooves or on a groove. In the case recording was performed in the as-depo amorphous state, the reliability was satisfactory. Thus, as-depo recording is possible and the reliability at overwriting can be ensured by laminating the crystal nucleus supplying layer and the phase change layer (where a reversible phase change is caused).

As described above, although the present invention has been described by way of the embodiments of the present invention, the present invention is not limited thereto, and can be applied to other embodiments based on the technical idea of the present invention.

For example, the information recording medium is not limited to the structures of the embodiments, and any information recording medium comprising the phase change layer laminated with the crystal nucleus supplying layer can be used.

Since the information recording medium of the present invention includes the phase change layer laminated with the crystal nucleus supplying layer, information can be recorded reliably and easily. Furthermore, the information recording medium of the present invention eliminates the initialization process and allows as-depo recording. In particular, in the information recording medium with Ra>Rc, even if Rc is near 0%, good address reading properties and stable servo characteristics can be provided.

The method for manufacturing an information recording medium of the present invention allows the information recording medium of the present invention to be produced easily.

The method for recording/reproducing information on an information recording medium of the present invention allows information to be recorded reliably and easily.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An information recording medium comprising a recording layer formed on a substrate, the recording layer comprising:
   a phase change layer in which a reversible phase change is caused between a crystalline state and an amorphous state by irradiation of a light beam; and
   a crystallization-ability improving layer for improving a crystallization ability of the phase change layer;
   wherein the crystallization-ability improving layer is formed before the phase change layer is formed,
   crystal nucleus generation and crystal growth are caused during formation of the phase change layer,
   at least a portion of the phase change layer is in a crystalline phase after the formation; and
   wherein the crystallization-ability improving layer has a halite crystal structure.

2. The information recording medium according to claim 1, wherein A<B is satisfied, where A is an energy for crystallizing the phase change layer in the case where the crystallization-ability improving layer is formed, and B is an energy for crystallizing the phase change layer in the case where the crystallization-ability improving layer is not formed.

3. The information recording medium according to claim 1, wherein the crystallization-ability improving layer is formed of at least one selected from the group consisting of a telluride and a halogenide.

4. The information recording medium according to claim 3, wherein the telluride is at least one selected from the group consisting of SnTe, PbTe, GeTe—$Sb_2Te_3$ eutectic compositions (hereafter, referred to as GeSbTe eutectic) and GeTe—$Bi_2Te_3$ eutectic compositions (hereafter, referred to as GeBiTe eutectic), and the halogenide is at least one selected from the group consisting of $ZnF_2$ $AWF_3$, KF, $CaF_2$, NaF, $BaF_2$, $MgF_2$, $LaF_3$, and LiF.

5. The information recording medium according to claim 1, wherein the phase change layer has a halite type crystal structure.

6. The information recording medium according to claim 1, wherein the phase change layer comprises GeSb>Te.

7. The information recording medium according to claim 3, wherein the crystallization-ability improving layer is a telluride and a thickness dt (nm) of the crystallization-ability improving layer formed of the telluride is in a range of $1 \leq dt \leq 10$.

8. The information recording medium according to claim 3, wherein the crystallization-ability improving layer is a halogenide and a thickness df (nm) of the crystallization-ability improving layer formed of the halogenide is in a range of $1 \leq df \leq 20$.

9. The information recording medium according to claim 1, wherein a protective layer and a reflection layer are further laminated above the recording layer.

10. The information recording medium according to claim 9, wherein a light-absorption layer is formed between the protective layer and the reflection layer.

11. The information recording medium according to claim 1, wherein initialization of the recording layer is not required.

12. The information recording medium according to claim 1, which is a two layered information recording medium formed by attachment,
   wherein the substrate includes a first substrate and a second substrate, and the recording layer according to claim 1 is formed on both the substrates, and the attachment is performed in such a manner that the two substrates are positioned on outermost sides.

13. The information recording medium according to claim 12, wherein the recording layer according to claim 1 is formed on the first substrate side.

14. A method for manufacturing an information recording medium, the information recording medium comprising a recording layer including a crystallization-ability improving layer and a phase change layer,
   the method comprising forming the crystallization-ability improving layer, and then forming the phase change layer,
   wherein the phase change layer is formed at a rate r (nm/min) in a range of $5 \leq r \leq 20$, and
   wherein the crystallization-ability improving layer has a halite crystal structure.

15. The method for manufacturing an information recording medium according to claim 14, wherein the phase change layer is crystallized in a process of forming the phase change layer.

16. The method for manufacturing an information recording medium according to claim 14, wherein the crystallization-ability improving layer is formed of at least one selected from the group consisting of a telluride and a halogenide.

17. The method for manufacturing an information recording medium according to claim 16, wherein the telluride is at least one selected from the group consisting of SnTe, PbTe, GeSbTe eutectic, GeBiTe eutectic, and the halogenide is at least one selected from the group consisting of $ZnF_2$, $AlF_3$, KF, $CaF_2$ NaF, $BaF_2$, $MgF_2$, $LaF_3$ and LiF.

18. The method for manufacturing an information recording medium according to claim 14, wherein the phase change layer has a halite type crystal structure.

19. The method for manufacturing an information recording medium according to claim 14, wherein the phase change layer comprises GeSbTe.

20. The method for manufacturing an information recording medium according to claim 16, wherein the crystallization-ability improving layer is a telluride and a thickness dt (nm) of the crystallization-ability improving layer formed of the telluride is in a range of $1 \leq dt \leq 10$.

21. The method for manufacturing an information recording medium according to claim 16, wherein the crystallization-ability improving layer is a halogenide and a thickness df (nm) of the crystallization-ability improving layer formed of the halogenide is in a range of $1 \leq df \leq 20$.

22. The method for manufacturing an information recording medium according to claim 14, wherein a protective layer and a reflection layer are further laminated above the recording layer.

23. The method for manufacturing an information recording medium according to claim 14, wherein a light-absorption layer is formed between the protective layer and the reflection layer.

24. An information recording medium comprising at least a recording layer on a substrate, the recording layer comprising:
   a phase change layer in which a reversible phase change is caused between a crystalline state and an amorphous state by irradiation of a light beam; and
   a crystal nucleus supplying layer that is laminated on the phase change layer and accelerates crystallization of the phase change layer, and
   wherein the phase change layer has a halite crystal structure.

25. The information recording medium according to claim 24, wherein the phase change layer and the crystal nucleus supplying layer are formed uniformly all over.

26. The information recording medium according to claim 24, wherein the phase change layer and the crystal nucleus supplying layer are formed in a shape of an island.

27. The information recording medium according to claim 24, wherein the phase change layer is in an amorphous state after formation.

28. The information recording medium according to claim 24, wherein the crystal nucleus supplying layer and the phase change layer are formed from a substrate side in this order.

29. The information recording medium according to claim 28, further comprising a second crystal nucleus supplying layer for accelerating crystallization of the phase change layer,
   wherein the phase change layer and the second crystal nucleus supplying layer are formed from a substrate side in this order.

30. The information recording medium according to claim 24, wherein the phase change layer and the crystal nucleus supplying layer are formed from a substrate side in this order.

31. The information recording medium according to claim 24, wherein a transition temperature Tx1 (° C.) from an amorphous phase to a crystalline phase of the crystal nucleus supplying layer (hereinafter, referred to crystallization temperature) and a crystallization temperature Tx2 (° C.) of the phase change layer satisfy a relationship: Tx2>Tx1.

32. The information recording medium according to claim 24, wherein a melting point Tm1 (° C.) of the crystal nucleus supplying layer and a melting point Tm2 (° C.) of the phase change layer satisfy a relationship: Tm1>Tm2.

33. The information recording medium according to claim 24, wherein the crystal nucleus supplying layer is a compound comprising Te.

34. The information recording medium according to claim 33, wherein the crystal nucleus supplying layer comprises at least one selected from the group consisting of SnTe and PbTe.

35. The information recording medium according to claim 33, wherein the crystal nucleus supplying layer comprises SnTe—M, where M is at least one element or compound selected from the group consisting of N, Ag, Cu, Co, Ge, Mn, Nb, Ni, Pd, Pt, Sb, Se, Ti, V, Zr and PbTe).

36. The information recording medium according to claim 35, wherein a content of M is in a range from 0.5 to 50 atom %.

37. The information recording medium according to claim 24, wherein the phase change layer is formed of a chalcogen based material.

38. The information recording medium according to claim 24, wherein the phase change layer comprises at least one selected from the group consisting of GeTe, GeSbTe, TeSnSe, InSbTe and GeBiTe.

39. The information recording medium according to claim 24, wherein the phase change layer comprises GeSbTe and at least one element selected from the group consisting of Ag, Sn, Cr, Mn, Pb, Bi, Pd, Se, In, Ti, Zr, Au, Pt, Al and N.

40. The information recording medium according to claim 24, wherein a thickness d1 (nm) of the crystal nucleus supplying layer and a thickness d2 (nm) of the phase change layer satisfy a relationship: d2>d1.

41. The information recording medium according to claim 24, wherein a thickness d1 (nm) of the crystal nucleus supplying layer is in a range of $0.3<d1 \leq 5$.

42. The information recording medium according to claim 24, wherein a thickness d2 (nm) of the phase change layer is in a range of $3 \leq d2 \leq 20$.

43. The information recording medium according to claim 24, wherein a reflectance Rc (%) of the information recording medium when the phase change layer is in a crystalline phase and a reflectance Ra (%) of the information recording medium when the phase change layer is in an amorphous phase satisfy a relationship: Ra>Rc.

44. A method for manufacturing an information recording medium, the information recording medium comprising at least a recording layer on a substrate, the method comprising forming a recording layer,
   wherein the step of forming the recording layer includes first forming a phase change layer and then forming a crystal nucleus supplying layer by a vapor deposition method.

45. The method for manufacturing an information recording medium according to claim 44, wherein the vapor deposition method is at least one method selected from the group consisting of a vacuum evaporation method, a sputtering method, an ion plating method, a CVD (chemical vapor deposition) method, and a MBE (molecular beam epitaxy).

46. The method for manufacturing an information recording medium according to claim 44, wherein the step of forming the phase change layer is performed under a condition that allows the phase change layer to be amorphous.

47. The method for manufacturing an information recording medium according to claim 46, wherein the condition that allows the phase change layer to be amorphous is that a rate r(nm/min) at which the phase change layer is formed is in a range of $r \geq 30$.

48. A method for recording/reproducing information on an information recording medium, the information recording medium comprising at least a recording layer, wherein the recording layer includes a phase change layer and a crystal nucleus supplying layer, and information is recorded by causing a phase change in the phase change layer by irradiating the recording layer with a laser beam, and wherein the phase change layer has a halite crystal structure.

49. The method for recording/reproducing information on an information recording medium according to claim 48, wherein the crystal nucleus supplying layer comprises at least one selected from the group consisting of SnTe and PbTe.

50. The method for recording/reproducing information on an information recording medium according to claim 48, wherein the phase change layer comprises at least one selected from the group consisting of GeTe, GeSbTe, TeSnSe, InSbTe and GeBiTe.

51. The method for recording/reproducing information on an information recording medium according to claim 48, wherein the phase change layer is formed in an amorphous state, and recording information is started on the phase change layer in the amorphous state without the phase change layer being crystallized.

* * * * *

UNITED STATES PATENT AND TRADEMARK OFFICE
CERTIFICATE OF CORRECTION

PATENT NO.   : 6,416,837 B1
DATED        : July 9, 2002
INVENTOR(S)  : Kojima et al.

It is certified that error appears in the above-identified patent and that said Letters Patent is hereby corrected as shown below:

Column 29,
Lines 42-51, Table 15, left column: "2-02 to 2-11" should read -- 3-02 to 3-11 --

Column 40,
Line 20, "AWF$_3$" should read -- AlF$_3$ --
Line 26, "GeSb>Te" should read -- GeSbTe --
Line 65, "5$\leq$ r$\geq$20," should read -- 5$\leq$r$\leq$20, --

Signed and Sealed this

Twenty-second Day of July, 2003

JAMES E. ROGAN
*Director of the United States Patent and Trademark Office*